US011808473B2

(12) United States Patent
Matsuura et al.

(10) Patent No.: US 11,808,473 B2
(45) Date of Patent: Nov. 7, 2023

(54) ACTION OPTIMIZATION DEVICE, METHOD AND PROGRAM

(71) Applicant: NIPPON TELEGRAPH AND TELEPHONE CORPORATION, Tokyo (JP)

(72) Inventors: Nobuhiko Matsuura, Musashino (JP); Midori Kodama, Musashino (JP); Takahiro Hata, Musashino (JP); Motonori Nakamura, Musashino (JP); Ippei Shake, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 3 days.

(21) Appl. No.: 17/263,255

(22) PCT Filed: Jul. 16, 2019

(86) PCT No.: PCT/JP2019/027911
§ 371 (c)(1),
(2) Date: Jan. 26, 2021

(87) PCT Pub. No.: WO2020/022123
PCT Pub. Date: Jan. 30, 2020

(65) Prior Publication Data
US 2021/0140670 A1  May 13, 2021

(30) Foreign Application Priority Data

Jul. 27, 2018 (JP) .................................. 2018-141754

(51) Int. Cl.
*F24F 11/63* (2018.01)
*A47L 9/28* (2006.01)
(Continued)

(52) U.S. Cl.
CPC ............... *F24F 11/63* (2018.01); *A47L 9/281* (2013.01); *A47L 9/2826* (2013.01); *G05B 13/0265* (2013.01); *G05B 13/048* (2013.01)

(58) Field of Classification Search
CPC . F24F 11/63; F24F 11/47; A47L 9/281; A47L 9/2826; A47L 11/4011;
(Continued)

(56) References Cited

U.S. PATENT DOCUMENTS

2010/0250481 A1    9/2010  Tomastik
2011/0307112 A1* 12/2011  Barrilleaux .......... H05B 47/105
                                          700/291
(Continued)

FOREIGN PATENT DOCUMENTS

JP    2011231946 A    11/2011
JP    2013124833 A     6/2013
(Continued)

OTHER PUBLICATIONS

Tomohiro Asazuma, "Smart BEMS that balances building comfort and energy saving and supports safety and security," Toshiba Review, vol. 68, No. 12 (2013), pp. 26-29.
(Continued)

*Primary Examiner* — Thomas C Lee
*Assistant Examiner* — Anzuman Sharmin
(74) *Attorney, Agent, or Firm* — Harness, Dickey & Pierce, P.L.C.

(57) ABSTRACT

Provided is a highly reliable technology for optimizing an action for controlling an environment in a target space. An action optimization device for optimizing an action for controlling an environment: acquires environmental data related to a state of the environment; performs time/space interpolation on the acquired environmental data; trains an environment reproduction model, based on the time/space-
(Continued)

interpolated environmental data, such that, when a state of an environment and an action for controlling the environment are input, a correct answer value for an environmental state after the action is output; trains an exploration model such that an action to be taken next is output when an environmental state output from the environment reproduction model is input; predicts a second environmental state corresponding to a first environmental state and a first action by using the trained environment reproduction model; explores for a second action to be taken for the second environmental state; and outputs a result of the exploration.

7 Claims, 18 Drawing Sheets

(51) Int. Cl.
  *G05B 13/02* (2006.01)
  *G05B 13/04* (2006.01)
  *G06N 3/044* (2023.01)
  *A47L 11/40* (2006.01)
  *G06N 3/006* (2023.01)
  *G06N 7/01* (2023.01)
  *G06N 20/00* (2019.01)

(58) Field of Classification Search
  CPC . A47L 9/2815; G05B 13/0265; G05B 13/048; G05B 15/02; G05B 23/02; G06N 3/0445; G06N 3/0454; G06N 3/006; G06N 7/005; G06N 20/00; G06N 3/044; G06N 3/045; G06N 7/01; G01R 19/00; G06F 30/13
  See application file for complete search history.

(56) References Cited

U.S. PATENT DOCUMENTS

| | | | | |
|---|---|---|---|---|
| 2015/0316907 | A1* | 11/2015 | Elbsat | G06Q 50/06 700/275 |
| 2016/0223214 | A1* | 8/2016 | Turner | G01N 25/18 |
| 2019/0075687 | A1* | 3/2019 | Brunstetter | G05B 13/027 |
| 2019/0187635 | A1* | 6/2019 | Fan | F24F 11/63 |
| 2019/0252079 | A1* | 8/2019 | Constantin | A61B 5/7435 |
| 2019/0378020 | A1* | 12/2019 | Camilus | G06N 20/00 |
| 2019/0385061 | A1* | 12/2019 | Chaudhury | G06N 7/005 |
| 2020/0005455 | A1* | 1/2020 | Alshurafa | G01N 21/27 |
| 2020/0134891 | A1* | 4/2020 | Ohta | F24F 11/523 |
| 2021/0201156 | A1* | 7/2021 | Hafner | G06N 3/084 |
| 2022/0019678 | A1* | 1/2022 | Kumaresan | G06F 21/604 |

FOREIGN PATENT DOCUMENTS

| | | | |
|---|---|---|---|
| JP | 2013536394 A | * | 9/2013 |
| JP | 2015200639 A | | 11/2015 |
| JP | 2018048750 A | | 3/2018 |

OTHER PUBLICATIONS

Toru Nabeyama, "Research on New Business Possibilities and Areas of IoT", Nikkei Research Monthly Report, 2017, 5, pp. 74-83.
Tatsuyoshi Okimoto, "Econometric Time Series of Economic and Finance Data", Asakura Publishing Co., Ltd., Sep. 10, 2017, twelfth print.
Kenji Aoki, "Geostatistics", Morikita Publishing Co., Ltd., Aug. 18, 2011, first edition, third print.
Xingjian Shi, et al., Convolutional LSTM network: A Machine Learning Approach for Precipitation Nowcasting. NIPS, 2015.
Csaba Szepesvari, translator representative & edited by Sotetsu Koyamada, translation supervised by Shinichi Maeda & Masanori Koyama, "Intensive Learning: Reinforcement Learning—Basic Theory and Algorithm", Kyoritsu Shuppan Co., Ltd., Sep. 25, 2017, first edition, first print.
C. M. Bishop, translation supervised by Hiroshi Genta et al., "Pattern Recognition and Machine Learning, vol. 1", Maruzen Publishing Co., Ltd., Jul. 30, 2016, seventh print.
Théophane Weber, Imagination-Augmented Agents for Deep Reinforcement Learning, V2, Feb. 14, 2018, pp. 1-12, [retrieval date Sep. 24, 2019], Internet: <URL:https://arxiv.org/pdf/1707.06203.pdf>.
International Search Report issued in PCT/JP2019/027911, dated Oct. 1, 2019.
Théophane Weber, Imagination-Augmented Agents for Deep Reinforcement Learning, V2, Feb. 2018, pp. 1-12, [retrieval date Sep. 24, 2019], Internet: <Li RL:https://arxiv.org/pdf/1707.06203.pdf>.
Shafiei, Seyed Ehsan et al., "Model Predictive Control for a Thermostatic Controlled System", 2013 European Control Conference (ECC), Jul. 17-19, 2013, Zurich Switzerland.

* cited by examiner

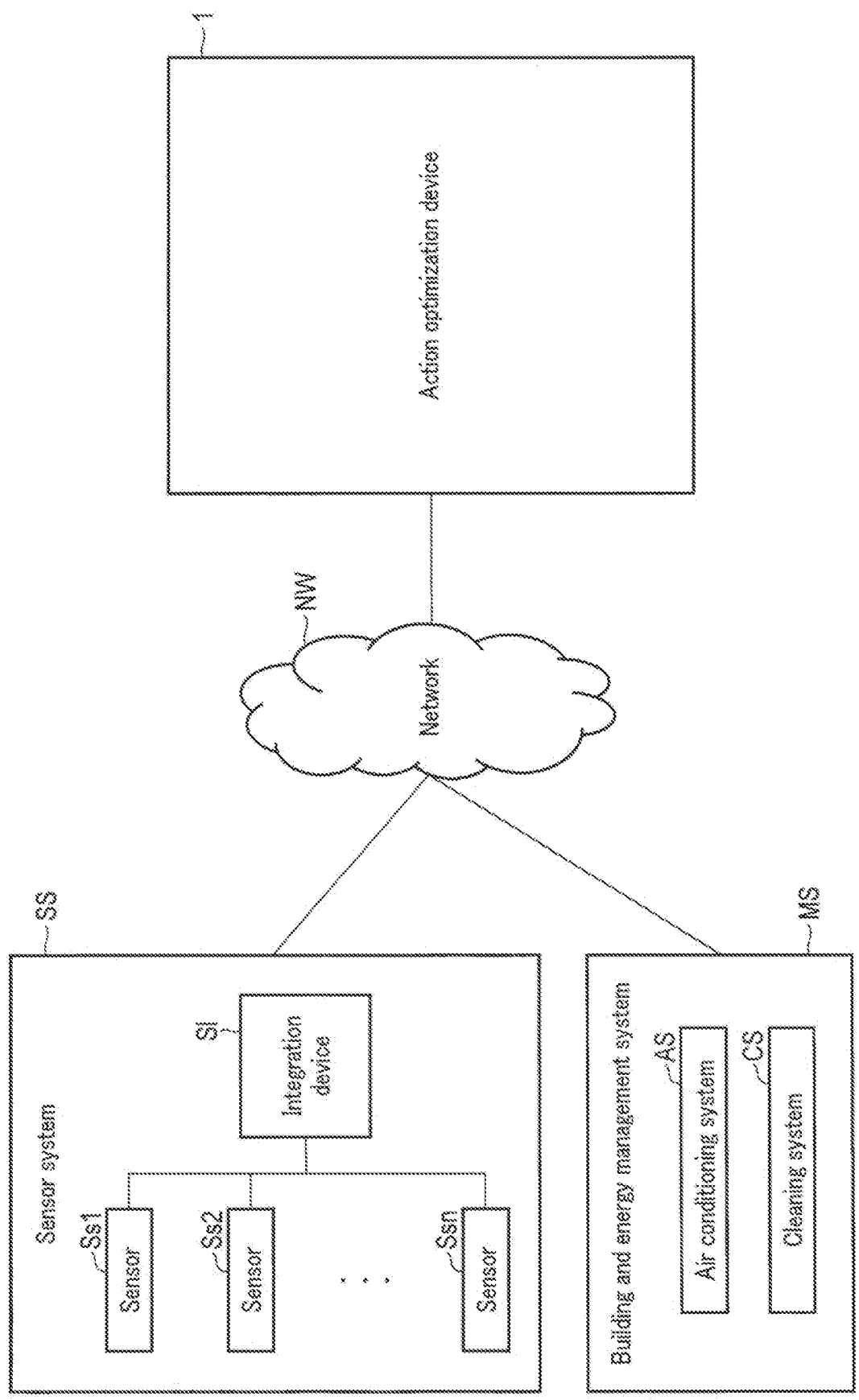
F I G. 1

| Time | Identifier | Air conditioning | Set temperature |
|---|---|---|---|
| 2017-02-18, 09:50:00 | C1 | OFF | 18.0 |
| 2017-02-18, 10:00:00 | C1 | ON | 18.0 |
| 2017-02-18, 10:00:00 | C2 | ON | 18.0 |
| 2017-02-18, 10:00:10 | C3 | ON | 20.0 |

| Identifier | Action | State | Reward function | Reproduction method | Exploration method |
|---|---|---|---|---|---|
| 1 | Air conditioning | People flow, temperature, humidity, outside air | [Binary] | Convolutional LSTM | Deep Q-Network |
| 2 | Cleaning | People flow, dirt, airflow | [Binary] | Multiple regression | Dynamic programming |

F I G. 11

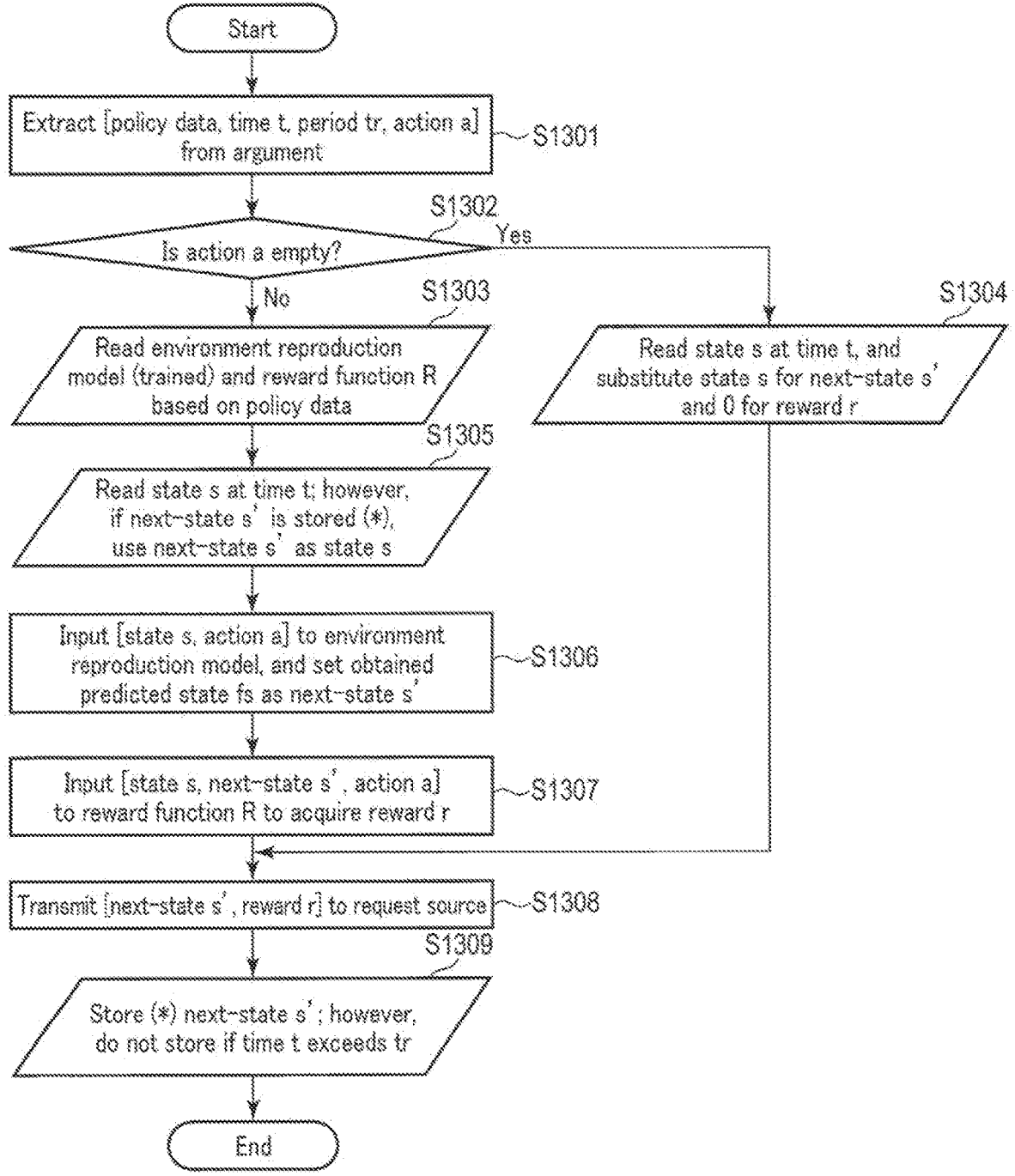
F I G. 14

| Time | Action 1 | Action 2 |
|---|---|---|
| 2017-02-18, 10:00:00 | ON | ON |
| 2017-02-18, 12:00:00 | OFF | ON |
| 2017-02-18, 14:00:00 | ON | OFF |

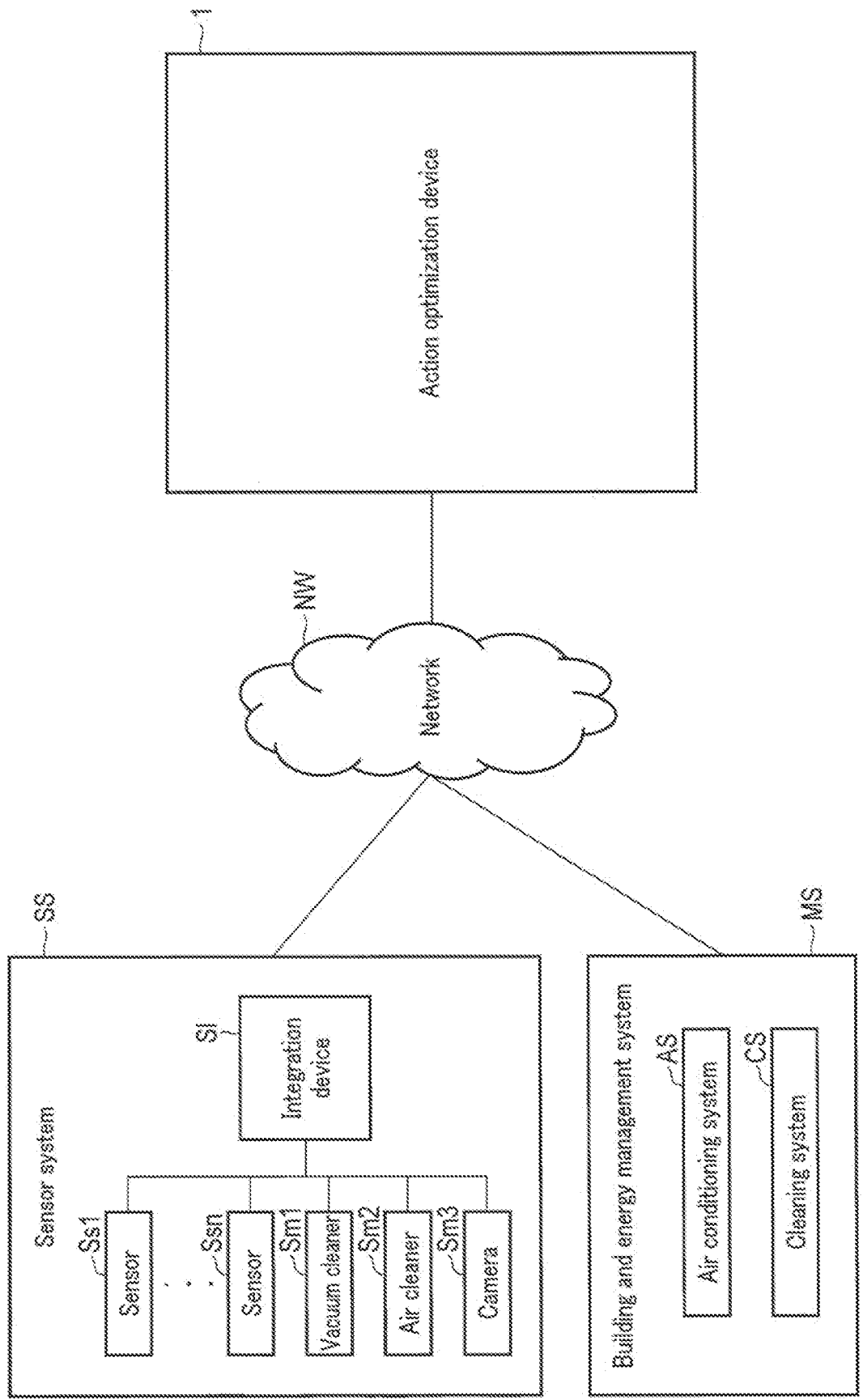
F I G. 20

ACTION OPTIMIZATION DEVICE, METHOD AND PROGRAM

CROSS-REFERENCE TO RELATED APPLICATIONS

This is a U.S. national phase application under 35 USC 371 of international application PCT/JP2019/027911, filed on Jul. 16, 2019, which claims priority to Japanese patent application No. 2018-141754, filed on Jul. 27, 2018. The entire disclosures of the above applications are incorporated herein by reference.

FIELD

An aspect of this invention relates generally to an action optimization device, a method, and a program for optimizing an action for controlling an environment in a target space.

BACKGROUND

In management of buildings and facilities such as office buildings, a technique has been proposed for optimizing operations (hereinafter, collectively referred to as "control" or "action for controlling an environment") to be performed with respect to an operation state of devices and equipment including air conditioners, and arrangement of cleaning personnel. For example, a building energy management system (BEMS) (see Non-Patent Literature 1) for the purpose of grasping and reducing energy consumption of air conditioners, etc., and a cleaning optimization system (see Non-Patent Literature 2) for optimizing the number of cleaning staff in accordance with the number of users of a toilet are known. In these techniques, various feedback-type optimization systems utilizing various data are used.

On the other hand, a feedforward-type optimization system is known which measures a flow and the number of people in a predetermined space (hereinafter, referred to as a "people flow") and controls an operation of a device taking into account a predicted value based on the measurement result (see Patent Document 1). In the technique of Patent Document 1, a people flow ratio of an adjacent space known to have a correlation with a target space is measured in advance, a predicted amount of people flow of the target space is calculated by multiplying the people flow ratio by an amount of people flow obtained from the adjacent space, and an upper limit of an energy consumption amount is set according to the predicted amount of people flow.

CITATION LIST

Patent Literature

[Patent Document 1] Jpn. Pat. Appln. KOKAI Publication No. 2011-231946

Non Patent Literatures

[Non-Patent Literature 1] Tomohiro Asazuma, "Smart BEMS that balances building comfort and energy saving and supports safety and security," Toshiba Review, Vol. 68, No. 12 (2013), pp. 26-29
[Non-Patent Literature 2] Toru Nabeyama, "Research on New Business Possibilities and Areas of IoT", Nikkei Research Monthly Report, 2017. 5, pp. 74-83

SUMMARY

Technical Problem

However, since a feedback-type system is used in the techniques described in Non-Patent Literature 1 and Non-Patent Literature 2, where, for example, a non-optimal state in which a room temperature in a facility becomes too cold or dirt becomes conspicuous is detected and control is optimized. Thus, a time lag until returning to an optimal state is a problem.

On the other hand, in the technique described in Patent Document 1, a feedforward-type optimization system that takes into account a predicted value of a people flow, which is one of the factors causing a non-optimal state, is used. However, the system of Patent Document 1 simply follows a short-term increase and decrease of the people flow, and thus cannot optimize control taking into account a medium-term and long-term increase and decrease of the people flow such as whether the people flow is continuously large or the people flow rapidly decreases. In addition, since an upper limit of an energy consumption amount is simply adjusted without estimating an effect of a control change, the system cannot consider control following an interaction existing in a target space such as impaired comfort of a user due to heat accumulation caused by people crowded in a place away from a representative point or impaired energy saving due to a prediction error caused by inflow and outflow of cold and hot air from and to the vicinity. Further, it is not easy to use the system for optimization problems other than the air conditioning control.

The present invention has been made in view of the above circumstances, and an object of the present invention is to provide a highly reliable action optimization technique for optimizing an action for controlling an environment in a target space taking into account a predicted effect.

Solution to Problem

In order to solve the above problem, a first aspect of the present invention provides an action optimization device for optimizing an action for controlling an environment in a target space, comprising an environmental data acquisition part that acquires environmental data related to a state of the environment in the target space; an environmental data interpolation part that performs time/space interpolation on the acquired environmental data according to a preset algorithm; an environment reproduction model training part that trains an environment reproduction model, based on the time/space-interpolated environmental data, such that, when a state of an environment and an action for controlling the environment are input, a correct answer value for an environmental state after the action is output; an exploration model training part that trains an exploration model such that an action to be taken next is output when an environmental state output from the environment reproduction model is input; an environment reproduction part that predicts a second environmental state corresponding to a first environmental state and a first action by using the environment reproduction model; an exploration part that explores for a second action to be taken for the second environmental state by using the exploration model; and an output part that outputs a result of the exploration by the exploration part.

According to a second aspect of the present invention, in the above first aspect, the exploration part outputs the explored for second action to the environment reproduction part, the environment reproduction part further predicts a third environmental state corresponding to the second environmental state and the second action output from the exploration part by using the environment reproduction model, and the exploration part further explores for a third action to be taken for the third environmental state by using the exploration model.

According to a third aspect of the present invention, in the above first aspect, the environment reproduction part further outputs a reward corresponding to the second environmental state based on a preset reward function, and the exploration model training part updates a training result of the exploration model based on the reward output from the environment reproduction part.

According to a fourth aspect of the present invention, in the above first aspect, the device further comprises an environment prediction part that performs future prediction using a preset time-series analysis method based on the environmental data to generate environment prediction data, and the exploration part explores for an action to be taken by using the environment prediction data for the exploration model.

According to a fifth aspect of the present invention, in the above first aspect, the device further comprises an environment expansion part that performs data augmentation on the environmental data based on a random number, and the environment reproduction model training part trains the environment reproduction model by using the environmental data subjected to the data augmentation.

According to a sixth aspect of the present invention, in the above first aspect, the device further comprises a policy data acquisition part that acquires policy data specifying information to be used for processing by the environment reproduction model training part, the exploration model training part, the environment reproduction part, or the exploration part.

According to a seventh aspect of the present invention, in the first aspect, the exploration part explores for, as the second action, an action of a group unit for a control target group obtained by grouping a plurality of control targets based on a predetermined criterion in advance, or a series of actions for one or more control targets for realizing a predetermined function.

Advantageous Effects of Invention

According to the first aspect of the present invention, an environment reproduction model is trained with a correspondence relationship among an environmental state, an action therefor, and an environmental state after the action, by using training data including three types of data respectively corresponding thereto, based on time/space-interpolated environmental data in a target space, and a change in environmental state is predicted from an environmental state and an action based on the trained environment reproduction model. In addition, an exploration model is trained such that an action to be taken next is output when an environmental state is input, and an action to be taken for the environmental state predicted by the environment reproduction model can thus be explored for by using the trained exploration model.

In this way, since time/space interpolation is performed on the acquired environmental data, it is possible to train the environment reproduction model by using data in a discretionary period without being limited to data at a specific time point in the past. By using such an environment reproduction model, it is possible to obtain a more reliable prediction result and perform a more reliable exploration using the prediction result. In addition, since environmental data other than a representative point can be used, it is possible to also explore for an action taking into account local environmental conditions such as heat accumulation. Note that heat accumulation generally refers to a local space having a higher temperature than the surroundings. Also, by using environmental data including a wide variety of information, it is possible to perform training or an exploration adapted to various conditions, not limited to air conditioning control, for example. Furthermore, since two types of models are used for the environment prediction and the exploration, it is also possible to further improve the reliability of the prediction by individually performing verification and adjustment by the respective devices.

According to the second aspect of the present invention, in the above first aspect, the environmental state predicted using the environment reproduction model and the action explored for using the exploration model for the environmental state are input to the environment reproduction model again, and a new environmental state is predicted. Then, the new environmental state is input to the exploration model again, and a further new action is explored for. Thereby, as the prediction result using the environment reproduction model and the exploration result using the exploration model function in a chained manner, it is possible to continue the exploration even if a pair of an environmental state and an action that does not exist in the training data is selected, obtaining actions to be taken for environmental states corresponding to a plurality of time points as a series of exploration results.

According to the third aspect of the present invention, in the above first aspect, a reward corresponding to a second environmental state predicted from a first environmental state and a first action therefor is obtained based on a preset reward function, and an update of the exploration model is performed based on the obtained reward. Thus, even in complicated optimization problems in which training data cannot be uniquely prepared, the exploration model can be trained, and an appropriate action can be explored for and output.

According to the fourth aspect of the present invention, in the above first aspect, an exploration for an action for controlling an environment is performed using data predicted by a time-series analysis based on environmental data. Thereby, even in a situation in which a predicted value related to environment information cannot be sufficiently acquired, it is possible to perform an exploration based on highly reliable prediction data.

According to the fifth aspect of the present invention, in the above first aspect, data augmentation based on a random number is performed on the acquired environmental data, and training of the environment reproduction model is performed using the environmental data subjected to the data augmentation. Since an apparent data amount can be increased by the data augmentation, it is possible to shorten the time required to collect a sufficient amount of environmental data for the training of the environment reproduction model.

According to the sixth aspect of the present invention, in the above first aspect, policy data related to various pieces of information necessary for training of the environment reproduction model, training of the exploration model, or evaluation using these models is acquired. This makes it possible to individually set training and evaluation methods according to a control target, environmental conditions, etc., to perform more flexible processing.

According to the seventh aspect of the present invention, in the above first aspect, an action of a group unit for a control target group or a series of actions for realizing a predetermined function is explored for as the second action. This makes it possible to realize further flexible processing according to a control target, a control purpose, a control environment, etc.

That is, according to each aspect of the present invention, it is possible to provide a highly reliable action optimization technique for optimizing an action for controlling an environment in a target space taking into account predicted effects.

BRIEF DESCRIPTION OF THE DRAWINGS

FIG. 1 is a diagram showing a first example of an overall configuration of a system including an action optimization device according to an embodiment of the present invention.

FIG. 11 is a diagram showing an example of policy data including information specifying an operation of the action optimization device shown in FIG. 1.

FIG. 14 is a flowchart showing an example of a procedure and processing contents of evaluation processing using an environment reproduction model by the action optimization device shown in FIG. 1.

FIG. 20 is a diagram showing a second example of an overall configuration of a system including an action optimization device according to an embodiment of the present invention.

DETAILED DESCRIPTION

In the following, embodiments according to the present invention will be described with reference to the accompanying drawings.

Embodiment

Example 1

(Configuration)
(1) System

FIG. 1 is a diagram showing a first example of an overall configuration of a system including an action optimization device 1 according to an embodiment of the present invention. In this example, the action optimization device 1 is assumed to optimize control of air conditioning as an action for controlling an environment in a target space. This system includes the action optimization device 1, one or more external sensors Ss1, Ss2, . . . , Ssn or an integration device SI that integrates them (hereinafter, collectively referred to as a "sensor system SS") and a building and energy management system MS that exists inside or outside a facility, such as an air conditioning system AS and a cleaning system CS, which are indirectly or directly connected to the action optimization device 1 via a network NW, a cable, etc.

The network NW includes, for example, an IP (Internet Protocol) network represented by the Internet and a plurality of access networks for accessing the IP network. As the access networks, not only a wired network using an optical fiber but also, for example, a mobile phone network operating under a standard such as 3G or 4G, a wireless local area network (LAN), etc. are used.

The external sensors Ss1, Ss2, . . . , Ssn are, for example, sensors that acquire various information about an environment in a target space, such as people flow sensors, temperature sensors, humidity sensors, and infrared sensors, and output various data, such as a people flow, a temperature, a humidity, and the presence/absence of an object. The integration device SI can, for example, integrally control operations of the external sensors Ss1, Ss2, . . . , Ssn, and integrally collect and transmit the data output by the external sensors Ss1, Ss2, . . . , Ssn.

The action optimization device 1 according to the embodiment can receive various information as environmental data from the sensor system SS and the building and energy management system MS via the network NW, a signal cable, etc., and transmit a control signal to the building and energy management system MS.

(2) Action Optimization Device (2-1) Hardware Configuration

Figure 2:
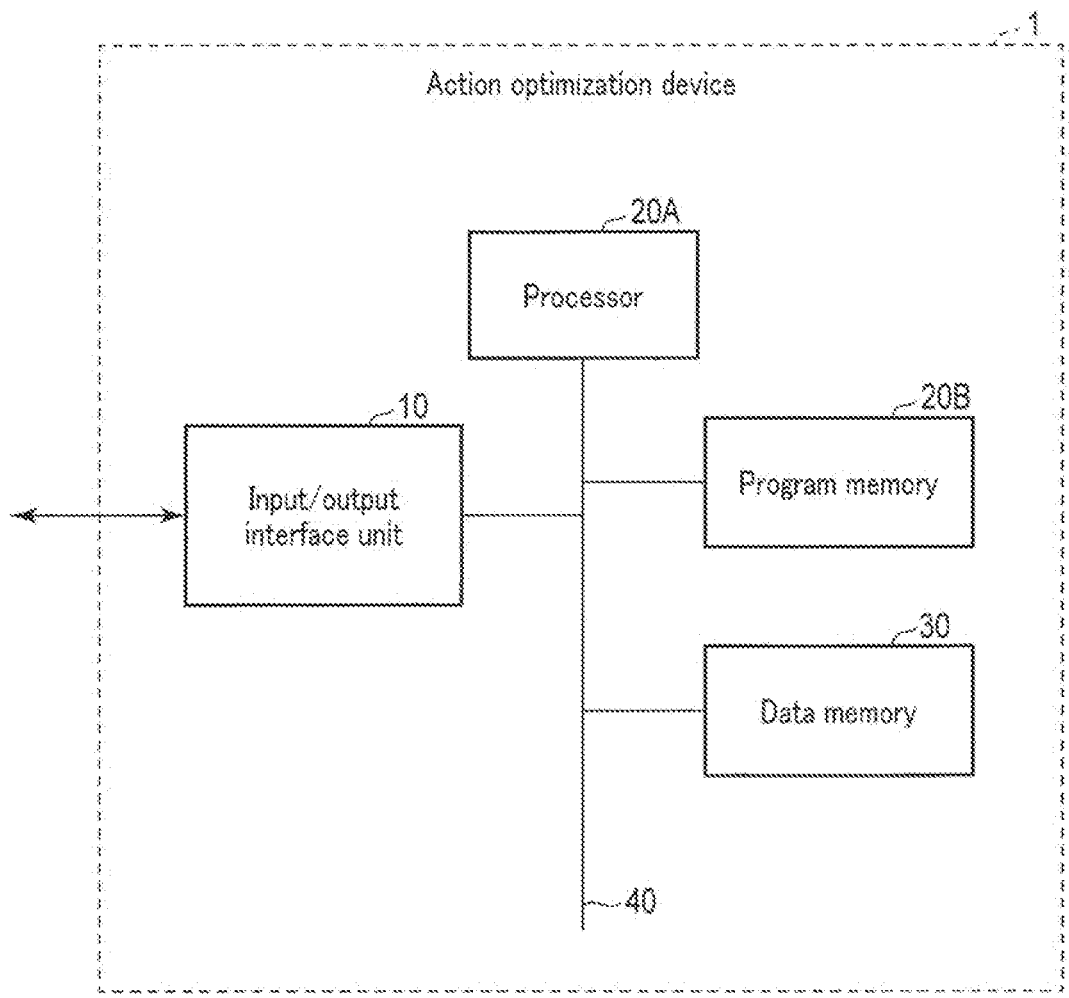
FIG. 2 is a block diagram showing a hardware configuration of the action optimization device shown in FIG. 1.

FIG. 2 is a block diagram showing an example of a hardware configuration of the action optimization device 1 according to the embodiment shown in FIG. 1. The action optimization device 1 includes, for example, a personal computer or a server device, and includes a hardware processor 20A such as a CPU (Central Processing Unit) or an MPU (Micro Processing Unit). An input/output interface unit 10, a program memory 20B, and a data memory 30 are connected to the hardware processor 20A via a bus 40.

The input/output interface unit 10 has, for example, a wired or wireless interface, and has a function of receiving environmental data transmitted from the sensor system SS or the building and energy management system MS and transmitting a control signal output from the action optimization device 1 to the building and energy management system MS. The input/output interface unit 10 also enables transmission and reception of information to and from a display device (not shown) and an input device (not shown). As the wired interface, for example, a wired LAN is used, and as the wireless interface, for example, an interface adopting a low-power wireless data communication standard such as a wireless LAN or Bluetooth (registered trademark) is used.

The input/output interface unit 10 also includes a GUI (Graphical User Interface), and can receive a policy instruction or an exploration instruction input by a user or an operator from the input device (not shown), for example.

The program memory 20B is a combination of a nonvolatile memory that can be written to and read from at any time, such as a hard disk drive (HDD) or a solid state drive (SSD), and a nonvolatile memory such as a read only memory (ROM), and stores programs necessary for executing various controlling/processing according to the embodiment.

The data memory 30 is, as a storage medium, a combination of a nonvolatile memory that can be written to and read from at any time, such as an HDD or an SSD, and a volatile memory such as a RAM (Random Access Memory), and is used to store various data acquired and created in the course of performing various processing.

(2-2) Software Configuration

Figure 3:
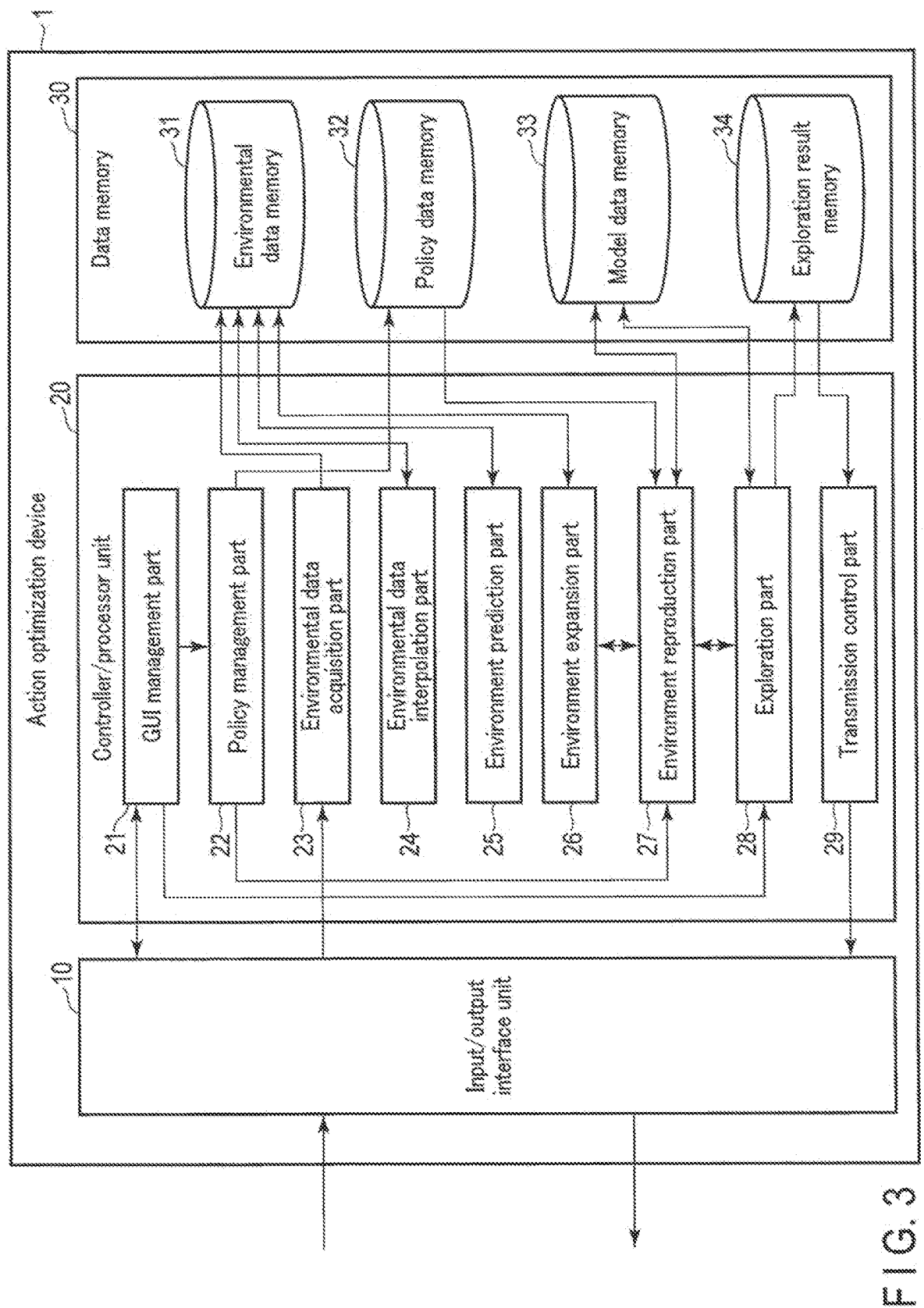
FIG. 3 is a block diagram showing a software configuration of the action optimization device shown in FIG. 1.

FIG. 3 is a block diagram showing a software configuration of the action optimization device 1 according to the embodiment shown in FIG. 1 in association with the hardware configuration shown in FIG. 2. The action optimization device 1 includes the input/output interface unit 10, a controller/processor unit 20, and a data memory 30.

A storage area of the data memory 30 includes an environmental data memory 31, a policy data memory 32, a model data memory 33, and an exploration result memory 34.

The environmental data memory 31 stores environmental data acquired from the sensor system SS and the building and energy management system MS. The environmental data is data related to an environment in a target space, and may include data representing control over the environment in addition to data representing a state of the environment. For example, the environmental data may include various kinds of information such as a set temperature and an operation mode of an air conditioner, and a cleaning schedule managed by the cleaning system CS, in addition to information sensed by various sensors such as a people flow, a temperature, a humidity, the presence of dirt or dust, and an amount of airborne particles.

The policy data memory 32 stores policy data including instruction information on various processing in the action optimization device 1 input by the user, etc. via the GUI. The policy data includes, for example, data used for training and information specifying a training method.

The model data memory 33 stores model data used by the action optimization device 1 for various processing. Each piece of model data is stored in a suitably executable format, such as a binary format, and may also include metadata representing a model name.

The exploration result memory 34 stores an exploration result obtained by exploration processing of the action optimization device 1.

However, the above memories 31 to 34 are not essential configurations, and the action optimization device 1 may directly acquire necessary data from the sensor system SS or the building and energy management system MS at any time. Alternatively, the memories 31 to 34 may not be incorporated into the action optimization device 1, and may be provided in an external storage device such as a database server arranged in a cloud, for example. In this case, the action optimization device 1 acquires necessary data by accessing the database server of the cloud via the network NW.

The controller/processor unit 20 includes the above-described hardware processor 20A and program memory 20B, and includes, as software processing function parts, a GUI management part 21, a policy management part 22, an environmental data acquisition part 23, an environmental data interpolation part 24, an environment prediction part 25, an environment expansion part 26, an environment reproduction part 27, an exploration part 28, and a transmission control part 29. These processing functions are all realized by causing the hardware processor 20A to execute programs stored in the program memory 20B. The controller/processor unit 20 may also be realized in other various forms including an integrated circuit such as an application specific integrated circuit (ASIC) or a field-programmable gate array (FPGA).

The GUI management part 21 provides a GUI for the user, operator, etc. to input an instruction related to processing of the action optimization device 1. For example, the GUI management part 21 displays a GUI on a display device (not shown), and receives a user instruction input via the GUI. In this embodiment, the GUI management part 21 can receive data to be used for training and information specifying a training method via the GUI, and output them to the policy management part 22 or the exploration part 28.

The policy management part 22 functions as a policy data acquisition part, generates policy data based on the information received from the GUI management part 21, and stores the generated policy data in the policy data memory 32. The policy management part 22 manages the policy data to arrange relationships between various instructions input via the GUI and models.

The environmental data acquisition part 23 acquires environmental data including information on an environment of a space to be controlled, which is transmitted by the sensor system SS or the building and energy management system MS, and stores the acquired environmental data in the environmental data memory 31. The environmental data includes, for example, people flow data acquired by a people flow sensor and temperature data acquired by a temperature sensor.

The environmental data interpolation part 24 performs time/space interpolation on the acquired environmental data by a preset method. For example, the environmental data interpolation part 24 reads environmental data for the past 1 hour every hour, and performs time interpolation and space interpolation on the read environmental data.

Herein, the time interpolation refers to processing of obtaining (estimating) data of a point intermediate in time with respect to a point of acquired data, e.g., processing of obtaining data at intervals of 1 minute in a case where the acquired environmental data is data at intervals of 10 minutes. Similarly, the space interpolation refers to processing of obtaining (estimating) data of a spatially intermediate point with respect to a point of acquired data, e.g., processing of obtaining a value corresponding to a position where a sensor is not installed from an actually measured value acquired at a position where a sensor is installed. Hereinafter, the time interpolation and the space interpolation are collectively referred to as "time/space interpolation".

The environment prediction part 25 performs future prediction using a preset time-series analysis method based on the acquired environmental data to generate environment prediction data.

The environment expansion part 26 performs data augmentation on the acquired environmental data based on a random number. Herein, data augmentation means processing of applying a small noise or a mask to an input side or applying common affine transformation to both the input side and an output side, and is intended to improve robustness of prediction processing by performing such processing according to a random number.

The environment reproduction part 27 has two operation phases, a training phase and an evaluation phase. In the training phase, the environment reproduction part 27 functions as an environment reproduction model training part, and trains an environment reproduction model such that, when a state of an environment and an action for controlling the environment are input, a correct answer value for an environmental state after the action is output (hereinafter, a model used in the environment reproduction part 27 is referred to as an "environment reproduction model"). On the other hand, in the evaluation phase, the environment reproduction part 27 predicts, based on an environmental state and an action therefor, an environmental state after the action by using the trained environment reproduction model.

The exploration part 28 also has two operation phases, i.e., a training phase and an evaluation phase. In the training phase, the exploration part 28 functions as an exploration model training part, and trains an exploration model such that, when an environmental state is input, an action to be taken next is output (hereinafter, model data used in the exploration part 28 is referred to as an "exploration model"). On the other hand, in the evaluation phase, the exploration part 28 explores for, based on an environmental state, a more appropriate action to be taken therefor by using the trained exploration model (exploration processing). For example, the exploration part 28 performs prediction (evaluation) of an action a for a state s at each time t to transition to an optimal next-state s' during a designated time period, and outputs an optimized action schedule.

The transmission control part 29 functions as an output part, and transmits (outputs) an exploration result output by the exploration part 28 in the evaluation phase to the building and energy management system MS, etc.

(Operation)

Next, an information processing operation by each part of the action optimization device 1 configured as described above will be described.

(1) Acquisition of Environmental Data

Figures 4, 5A, 5B:
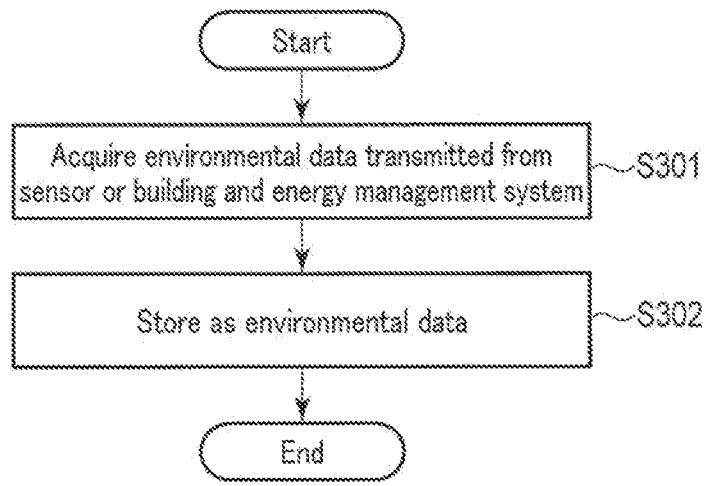
FIG. 4 is a flowchart showing an example of a processing procedure and processing contents of environmental data acquisition by the action optimization device shown in FIG. 1.
FIG. 5A is a diagram showing people flow data as an example of the environmental data.
FIG. 5B is a diagram showing temperature data as an example of the environmental data.

FIG. 4 is a flowchart showing an example of a processing procedure and processing contents of environmental data acquisition by the action optimization device 1.

First, in step S301, the action optimization device 1 acquires environmental data transmitted from the sensor system SS or the building and energy management system MS under control of the environmental data acquisition part 23. In the embodiment, the environmental data includes at least people flow data, and may further include other various data acquired from the sensor system SS and the building and energy management system MS.

The sensor system SS or the building and energy management system MS may transmit the environmental data at various timings. For example, the sensor system SS or the building and energy management system MS may acquire data at a predetermined sampling cycle, accumulate the data, and directly transmit the accumulated data to the action optimization device 1 at regular time intervals (e.g., 1 hour). Alternatively, the action optimization device 1 may transmit a data transmission request to the sensor system SS or the building and energy management system MS at regular time intervals or in response to an input of an instruction from the user, and the sensor system SS or the building and energy management system MS may transmit the latest environmental data or the accumulated data to the action optimization device 1 in response to the data transmission request. Alternatively, the environmental data transmitted from the sensor system SS or the building and energy management system MS may be, for example, accumulated in a database server (not shown) via the network NW, and the action optimization device 1 may read necessary data from the database server at regular time intervals or in response to an input of an instruction from the user.

In step S302, the action optimization device 1 stores the acquired environmental data in the environmental data memory 31.

Figures 5C, 6:
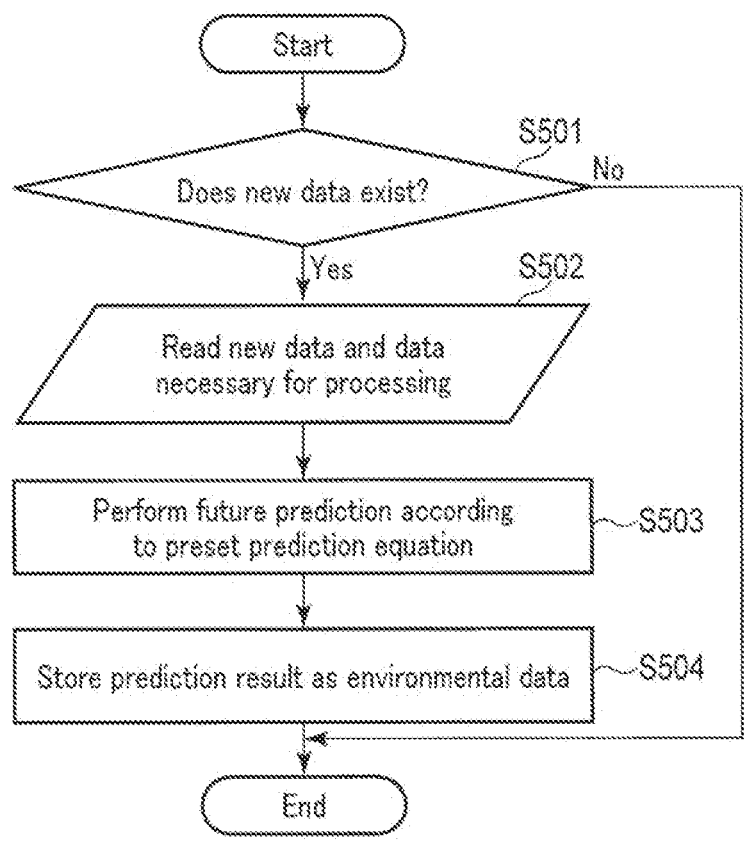
FIG. 5C is a diagram showing BEMS data as an example of the environmental data.
FIG. 6 is a flowchart showing an example of a processing procedure and processing contents of prediction of the environmental data by the action optimization device shown in FIG. 1.

FIGS. 5A to 5C are diagrams showing examples of the environmental data.

FIG. 5A shows people flow data as an example of the environmental data. In the embodiment, the people flow data includes fields of "time" indicating a time at which a sensor measures a people flow, "identifier" indicating a place where the sensor is installed, and "number of people" measured by the sensor. Various sensors such as a laser sensor, an infrared sensor, and a camera can be used as the sensor for measuring the people flow. The field items of the people flow data are not limited to those shown in FIG. 5A, and various field items may be used, e.g., the number of people present in a discretionary measurement section (e.g., a 1 m square mesh with an interval of 1 second) per unit time, as the number of people.

FIG. 5B shows temperature data as an example of the environmental data. In the embodiment, the temperature data includes fields of "time" indicating a time at which a sensor measures a temperature, "identifier" indicating a place where the sensor is installed, and "temperature" measured by the sensor. As the sensor for measuring the temperature, various sensors such as a thermocouple, a temperature measuring resistor, and a thermistor can be used. The field items of the temperature data are not limited to those shown in FIG. 5B, and various field items may be used. For example, a field indicating temperature accuracy may be newly provided.

FIG. 5C shows BEMS data as an example of the environmental data. In the embodiment, the BEMS data represents data related to air-conditioning control that can be mainly acquired from the building and energy management system MS, and includes fields of "time" indicating a time at which the record is written in the management system, "identifier" indicating which of a plurality of air conditioners the record corresponds to, "air conditioning" indicating whether to turn on or off the air conditioner, and "set temperature" indicating the temperature of air blown from the air conditioner. Again, the field items are not limited to these, and for example an air supply field indicating an amount of air supplied from the air conditioner may be newly provided.

In addition to the shown field names and values, the environmental data may also include metadata indicating data names such as "people flow" and "temperature" (not shown). Data having a plurality of fields, such as BEMS data, may be divided into, for example, air-conditioning data including measurement time, identifier, and air conditioning, and air-conditioning set temperature data including measurement time, identifier, and set temperature, to be managed with finer granularity.

(2) Prediction of Environmental Data

FIG. 6 is a flowchart showing an example of a processing procedure and processing contents for predicting environmental data by the action optimization device 1 using a preset time-series analysis method. In the embodiment, the environment prediction part 25 predicts environmental data for the next one day by using an autoregressive moving average (ARMA) model (see, e.g., Tatsuyoshi Okimoto, "Econometric Time Series of Economic and Finance Data", Asakura Publishing Co., Ltd., Sep. 10, 2017, twelfth print), which is a time series analysis method. The environment prediction part 25 may be automatically activated at predetermined time intervals, or may be activated in response to an input of an instruction from a user or an operator. In the embodiment, the environment prediction part 25 is automatically activated for each day to perform the following processing.

First, in step S501, under control of the environment prediction part 25, the action optimization device 1 determines whether or not there is any new environmental data stored in the environmental data memory 31 since the previous activation. If it is determined in step S501 that no new data exists, the processing is ended. On the other hand, if it is determined in step S501 that new data exists, the process proceeds to step S502.

In step S502, under the control of the environment prediction part 25, the action optimization device 1 reads the new data and data necessary for processing. In the embodiment, the environment prediction part 25 reads new data and, if the amount of new data is smaller than order parameters of the ARMA model, the missing data.

In step S503, the action optimization device 1 performs future prediction according to a preset prediction equation under the control of the environment prediction part 25. In the embodiment, the environment prediction part 25 uses the ARMA model as the preset prediction equation, estimates weight parameters of the ARMA model, and performs prediction for the next one day by using the identified model. In the ARMA model, when a predicted value is $v_t$, past actually measured values are $(v_{t-1}, v_{t-2}, \ldots, v_0)$, and errors are $(\varepsilon_{t-1}, \varepsilon_{t-2}, \ldots, \varepsilon_0)$, prediction is performed by $$v_t = \phi_1 v_{t-1} + \ldots + \phi_p v_{t-p} + \theta_1 \epsilon_{t-1} + \ldots + \theta_q \epsilon_{t-q} =$$
$$\sum_{i=1}^{p} \phi_i v_{t-i} + \sum_{j=1}^{q} \theta_j \epsilon_{t-j} = AR(p) + MA(q)$$

[Equation 1]

which is a model of combining an autoregressive model (AR) expressed by a weighted sum of p past values and a moving average model (MA) expressed by a weighted sum of q errors. In the equation, $\varphi_i$ and $\theta_i$ are parameters representing weights, and p and q are parameters representing orders.

Among them, p and q are estimated in advance by, with all the actually measured values $(v_{t-1}, \ldots, v_0)$, selecting appropriate ones from periods represented by plotting a graph of partial autocorrelation, or automatically calculating them by such maximum likelihood estimation as to minimize Akaike's Information Criterion (AIC) or Bayesian Information Criterion (BIC). If optimum values are known in advance, the values may be written in a config file and the values in the config file may be referred to. Further, $\varphi_i$ and $\theta_i$ are automatically calculated by maximum likelihood estimation that minimizes an error by using $(v_{t-1}, \ldots, v_{t-p})$ and $(\varepsilon_{t-1}, \ldots, \varepsilon_{t-q})$ given at the time of prediction.

In step S504, the action optimization device 1 stores the prediction result in the environmental data memory 31 as environmental data under the control of the environment prediction part 25. At this time, a flag indicating that the value is a predicted value may be stored together, and the flag value may be referred to in the subsequent processing to switch which one of the predicted value and the actually measured value is used. Herein, the "actually measured value" is an actually measured value (necessarily a time in the past) observed by the sensor system SS or the building and energy management system MS, whereas the "predicted value" is a value (necessarily a future time) predicted by the environment prediction part 25 or an external device (not shown) based on an actually measured value. In this embodiment, it is assumed that, at a certain time, when there is only a predicted value, the predicted value is used, and when there are both a predicted value and an actually measured value, the actually measured value is used.

The prediction processing is not limited to the above example, and for example, other prediction methods than the ARMA model may be used. As the prediction method, for example, another time-series analysis method such as a seasonal autoregressive integrated moving average model (SARIMA), a regression analysis method such as a multiple regression analysis using other types of correlated data, or a deep learning method such as a long-short term memory unit (LSTM) can also be used. In addition, an environmental data name and a method to be applied may be designated individually by the config file.

By providing the environment prediction part 25 in this way, even in an environment in which a predicted value (e.g., a predicted people flow or predicted weather) cannot be acquired from an external device, each instance of processing can be performed using the prediction data acquired as described above.

(3) Time/Space Interpolation of Environmental Data

Figures 7, 8:
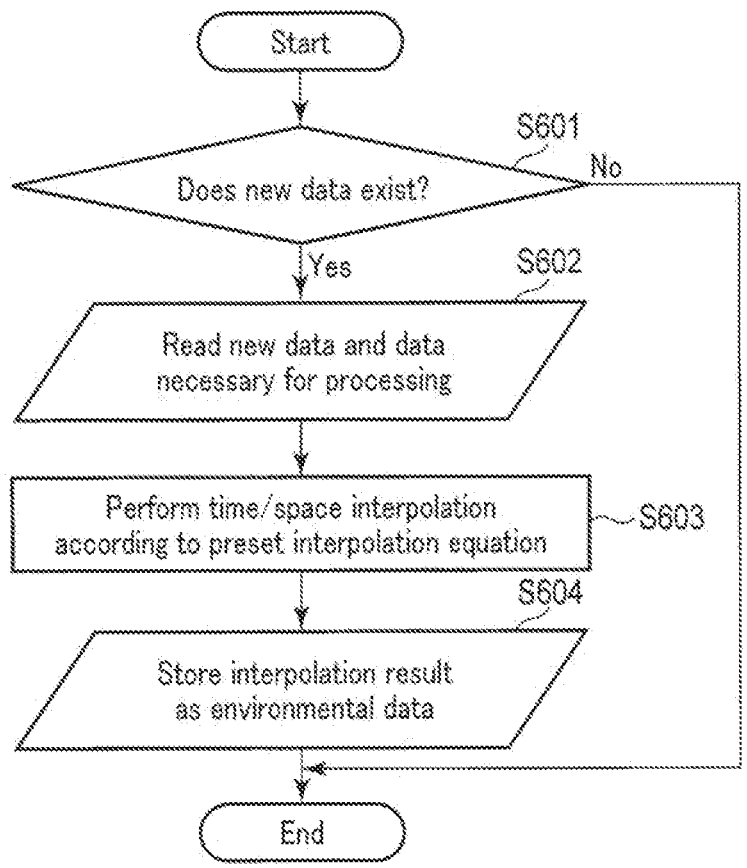
FIG. 7 is a flowchart showing an example of a processing procedure and processing contents of time/space interpolation of the environmental data by the action optimization device shown in FIG. 1.
FIG. 8 is a diagram showing an example of the environmental data to be subjected to the time/space interpolation processing shown in FIG. 7.

FIG. 7 is a flowchart showing an example of a processing procedure and processing contents for performing time/space interpolation on acquired environmental data by the action optimization device 1. In the embodiment, the environmental data interpolation part 24 performs this processing.

FIG. 8 shows an example of interpolation target data. In the embodiment, the environmental data interpolation part 24 performs interpolation from data (hereinafter, referred to as "point data") of a specific position (hereinafter, referred to as an "observation point") corresponding to a sensor installation location at intervals of 10 minutes as shown in FIG. 8 to data (hereinafter, referred to as "area data") of all points in a target area at intervals of 1 minute. The area data may be data obtained by interpolating three-dimensional points obtained by adding a height to two dimensions. The environmental data interpolation part 24 may be automatically activated at predetermined time intervals, or may be activated in response to an input of an instruction from a user or an operator. In the embodiment, the environmental data interpolation part 24 is automatically activated every hour to perform the following processing.

First, in step S601, under control of the environmental data interpolation part 24, the action optimization device 1 determines whether or not there is new environmental data stored in the environmental data memory 31 since the previous activation. In the example of FIG. 8, the environmental data interpolation part 24 determines whether or not values ($v_{10,1}, \ldots, v_{60,n}$) obtained from observation points ($x_1, \ldots, x_n$) at times ($t_{10}, t_{20}, \ldots, t_{60}$) after the previous activation time to exist in the environmental data memory 31 as environmental data. If it is determined in step S601 that there is no new data, the environmental data interpolation part 24 ends the processing. On the other hand, if it is determined in step S601 that new data exists, the process proceeds to step S602.

In step S602, the action optimization device 1 reads the new data and data necessary for processing under the control of the environmental data interpolation part 24.

Next, in step S603, the action optimization device 1 performs time/space interpolation on the read data according to a preset interpolation equation under the control of the environmental data interpolation part 24.

More specifically, the environmental data interpolation part 24 additionally reads the value of the time to in step S602, and in step S603, first applies a linear interpolation method to a set of values $$\vec{v}_{10,i} = (v_{0,i}, v_{10,i}, \ldots, v_{60,i}) \qquad \text{[Equation 2]}$$

of an observation point $x_i$ at intervals of 10 minutes to calculate a set of values $$\vec{v}_{1,i} = (v_{0,i}, v_{1,1}, \ldots, v_{60,i}) \qquad \text{[Equation 3]}$$

at intervals of 1 minute.

For example, an interpolation equation of a value $v_{k,i}$ at a time $t_k$ satisfying $t_j < t_k \le t_{j+10}$ is as follows.

$$v_{k,i} = v_{j,i} + \frac{v_{j+10,i} - v_{j,i}}{t_{j+10} - t_j}(t_k - t_j) \qquad \text{[Equation 4]}$$

The above is calculated for all time intervals {($t_0, t_{10}$), ($t_{10}, t_{20}$), . . . , ($t_{50}, t_{60}$)}, and is further applied to all observation points to perform time interpolation.

Next, an inverse distance weighting (IDW) is applied to a set of values $$\vec{v}_{t,n} = (v_{t,1}, \ldots, v_{t,n}) \qquad \text{[Equation 5]}$$

of n observation points at a certain time t (see, e.g., Hans Wackernagel, translated and edited by Geostatistics Research Committee, translation supervised by Kenji Aoki, "Geostatistics", Morikita Publishing Co., Ltd., Aug. 18, 2011, first edition, third print) to calculate a set of values $$\vec{v}_{t,n+m} = (v_{t,1}, \ldots, v_{t,n}, v_{t,n+1}, \ldots, v_{t,n+m}) \qquad \text{[Equation 6])}$$

including m unobserved points. For example, an interpolation equation when an unobserved point is u is as follows.

$$v_{t,u} = \frac{\sum_{i=1}^{n} w_i v_{t,i}}{\sum_{i=1}^{n} w_i}, \quad w_i = \frac{1}{\|u - x_i\|^p} \qquad \text{[Equation 7]}$$

This is calculated for all the m unobserved points.

The above equation is for obtaining a value of an unobserved point by a weighted average using a reciprocal of a distance as a weight, and p is a parameter for adjusting the degree of influence of neighboring points. The parameter p is automatically calculated by maximum likelihood estimation that minimizes an error based on $x_i$ and $v_{t,i}$ given at the time of interpolation. If optimum values are known in advance, the values may be written in a config file and the values in the config file may be referred to.

In step S604, under the control of the environmental data interpolation part 24, the action optimization device 1 stores the time/space-interpolated result obtained by the above processing in the environmental data memory 31 as area data of the environmental data.

For the time/space interpolation method, other methods may be designated such as using spline interpolation for the time interpolation and using kriging for the space interpolation, and an environmental data name and a method to be applied may be designated individually by the config file, etc. An interpolation interval in the time interpolation, the number and positions of unobserved points to be interpolated in the space interpolation, the processing order of the time interpolation and the space interpolation, etc. may be discretionarily set through the config file, etc.

Note that the environment prediction part 25 and the environmental data interpolation part 24 may perform each instance of processing not at regular time intervals but each time storage in the environmental data memory 31 is detected. In addition, the activation order of the environment prediction part 25 and the environmental data interpolation part 24 is discretionary, and the environmental data interpolation part 24 may perform interpolation on a result of the environment prediction part 25 or the environment prediction part 25 may perform prediction using a result of the environmental data interpolation part 24.

(4) Acquisition of Policy Information

Next, acquisition of policy information input via a GUI will be described.

Figure 9:
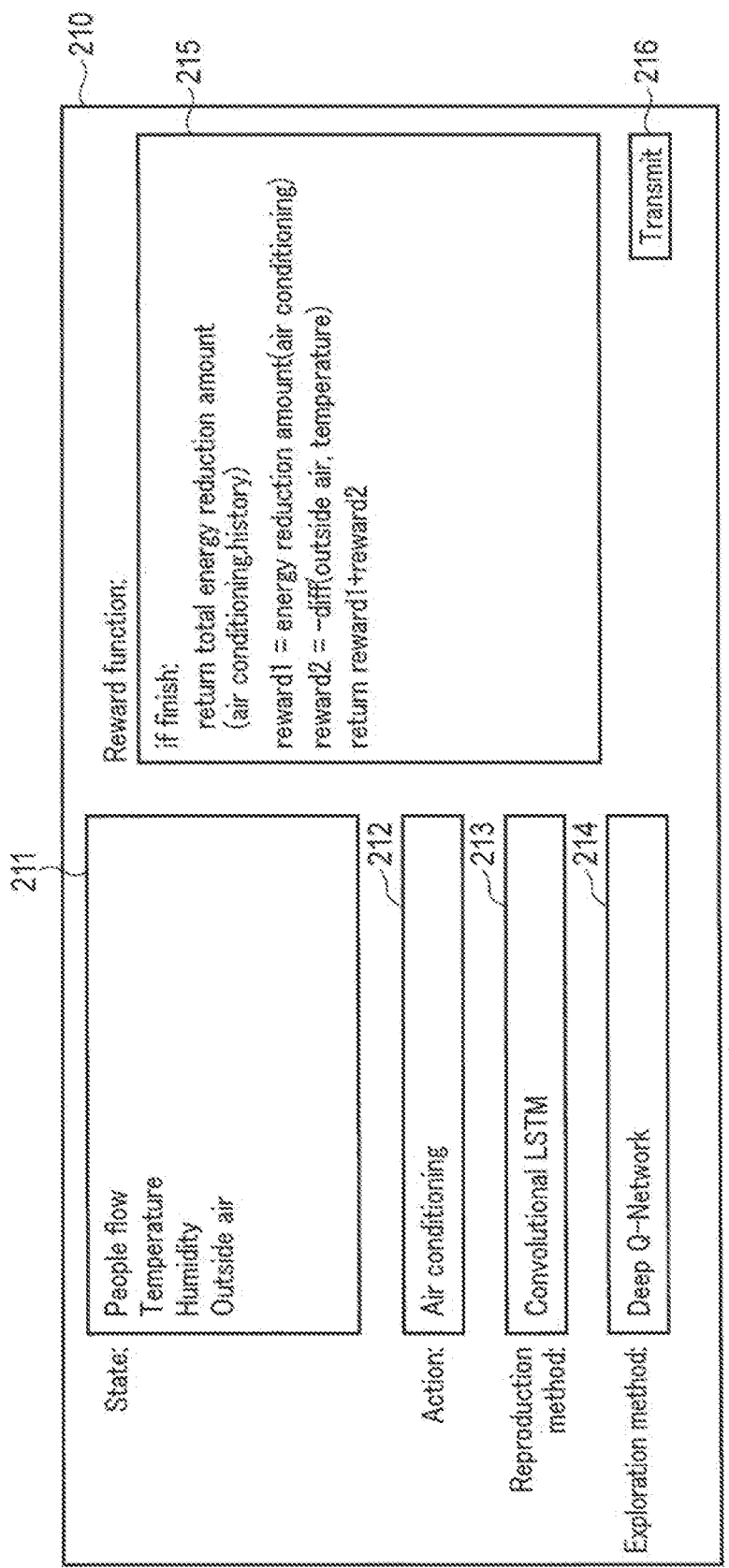
FIG. 9 is a diagram showing a first example of a GUI screen used for specifying an operation policy of the action optimization device shown in FIG. 1.

FIG. 9 shows a policy input screen 210 displayed on a display part, etc. (not shown) as an example of a GUI for inputting instructions (policies) related to various processing that is provided by the GUI management part 21 of the action optimization device 1. The GUI management part 21 can fetch a policy instruction input by a user or an operator using an input device (not shown) such as a keyboard, a mouse, or a touch panel via such a policy input screen 210. The policy input screen 210 includes text boxes 211 to 215 for inputting a state, an action, a reward function, a reproduction method, and an exploration method, and a transmission button 216 for ending the input, but the contents are not limited thereto.

An action field 212 is a field for inputting a control target in exploration processing. In the present embodiment, "air conditioning" represents an operating status of an air conditioner of ON/OFF, and it is assumed that one of several controls is optimized, but the embodiment is not limited thereto. For example, in the action field 212, another action such as a set temperature may be set, or an operating status of each of a plurality of air conditioners installed in the same target space may be set.

In addition, in the action field 212, a virtual action such as grouping control targets in several units or registering a predetermined procedure in advance may be set. Thus, for example, a plurality of air conditioners may be grouped according to whether they belong to a priority section with a large number of users or a normal section without a large number of users, and virtual actions in units of groups such as a "priority air conditioning group" and a "normal air conditioning group" may be set. The grouping method is not limited thereto, and the virtual action can be set in various units such as a section easily affected by the outside air or solar radiation, a section including a heat source such as a kitchen, and a section in which an event is held.

Further, a virtual action including a series of operations for realizing a predetermined function may be set. For example, in a case where there is a procedure determined at the time of manufacturing such as gradually reducing the air volume when air conditioning is stopped, a virtual action of "air conditioning stop" for performing an operation according to the procedure can be set. As other examples of such a virtual action, it is also possible to set procedures such as "startup preparation" for performing an operation across a plurality of devices having a dependency relationship such as operating a heat source before an air conditioning operation so as to adjust a water amount and a water temperature of a heat storage layer, "dehumidification mode" for performing an operation to increase a dehumidification effect by lowering a supply temperature and reducing an air supply amount, and "airflow control" for performing an operation to generate airflow by using an actuator such as a circulator or an air curtain or changing an indoor pressure balance by adjusting a ventilation amount and an air supply amount. However, the embodiment is not limited to these specific examples, and various procedures can be adopted as the virtual actions according to the purpose of use, the environment of use, etc. The virtual action may be related to an operation for a single control target, an operation for a plurality of control targets of the same type, or an operation for a plurality of control targets of different types.

A state field 211 is a field for inputting a name of environmental data that is affected when an action is changed. In the figure, people flow, temperature, humidity, and outside air are exemplified to be used, but the input data is not limited thereto and may include, for example, solar radiation amount.

The reproduction method field 213 is a field for inputting a method for the environment reproduction part 27 to predict a relationship between an action and a state. In the figure, using a method of a deep learning convolutional LSTM (see, e.g., Xingjian Shi, et al., Convolutional LSTM network: A Machine Learning Approach for Precipitation Nowcasting. NIPS, 2015) used for a short-term weather forecast, etc. is exemplified. In addition, it is assumed that, by using the method, a model that has an action a and a state s as inputs and outputs a next-state s' after 1 hour as an output has already been defined and stored as model data. However, the embodiment is not limited thereto, and a method such as outputting a next-state s' after a discretionary time (e.g., after 10 minutes or 1 day) passes, using another method such as a multiple regression analysis, or cooperating with a physical simulator such as a computational fluid dynamics simulator may be adopted.

The exploration method field 214 is a field for inputting a method for the exploration part 28 to perform an exploration. In the figure, using a method of Deep Q-Network in deep reinforcement learning is exemplified, but the embodiment is not limited thereto. Another reinforcement learning method such as dynamic programming or TD learning may be used (see, e.g., Csaba Szepesvari, translator representative & edited by Sotetsu Koyamada, translation supervised by Shinichi Maeda & Masanori Koyama, "Intensive Learning: Reinforcement Learning—Basic Theory and Algorithm", Kyoritsu Shuppan Co., Ltd., Sep. 25, 2017, first edition, first print).

As for the reproduction method field 213 and the exploration method field 214, it is exemplified that a corresponding model or simulator is registered as model data in advance, and the name of the model is input thereto. However, the embodiment is not limited thereto, and a program may be directly described, for example.

The reward function field 215 is a field for inputting an evaluation equation for an action determined by the exploration part 28 according to the method of the exploration method field 214. In the figure, when one cycle of training is completed, a total energy consumption reduction amount of one cycle is designated to be returned as a reward r, and in the other cases, a sum of an energy reduction amount (reward1) at that time and a negative value (reward2) of a difference between outside air and a temperature is designated to be returned as the reward r. In the latter case, at a certain time t, the higher the energy consumption reduction, the higher a value of reward1, and thereby an effect of lowering a peak value of an electric power from the viewpoint of energy saving is expected, and the lower a difference between outside air and a room temperature, the higher a value of reward2, and thereby an effect of preventing heat shock or cold shock from the viewpoint of comfort is expected. The embodiment is not limited thereto, and in an evaluation equation of a reward function, for example, a comfort index may be calculated from temperature and humidity values, or an amount of heat generated by a people flow may be taken into consideration.

Further, in an evaluation equation of a reward function, a generally known operation leading to energy saving may be highly evaluated. Examples of such an operation leading to energy saving include a peak cut/shift by an intermittent operation of an air conditioner or a thinning-out operation of unused sections, pre-stop of a heat source by stopping the heat source earlier than a business closing time and performing an air conditioning operation using only retained cold and hot water, natural ventilation utilization when an outdoor temperature is more comfortable than an indoor temperature, redundancy reduction of an air conditioning function for adjusting a set temperature to obtain a sufficient air conditioning effect while reducing an inlet/outlet temperature difference of cold and hot water, a large temperature difference of conversely increasing an inlet/outlet temperature difference of cold and hot water to reduce an amount of water or air used by an air conditioner, and outside air inflow prevention by air curtain activation in the vicinity of an opening when a pressure difference due to an indoor/outdoor temperature difference is large. However, the embodiment is not limited thereto, and various operations according to the purpose of use, the environment of use, etc. can be considered. Furthermore, these may be combined and designated in the form of a weighted sum according to the degree of importance.

Although the reward function field 215 directly describes the program, the embodiment is not limited thereto, and an evaluation equation may be registered as model data in advance and the name of the model data may be described.

In FIG. 9, when the transmission button 216 is pressed, the GUI management part 21 determines that the input has been completed and outputs the above content to the policy management part 22.

(5) Generation of Policy Data

Figure 10:
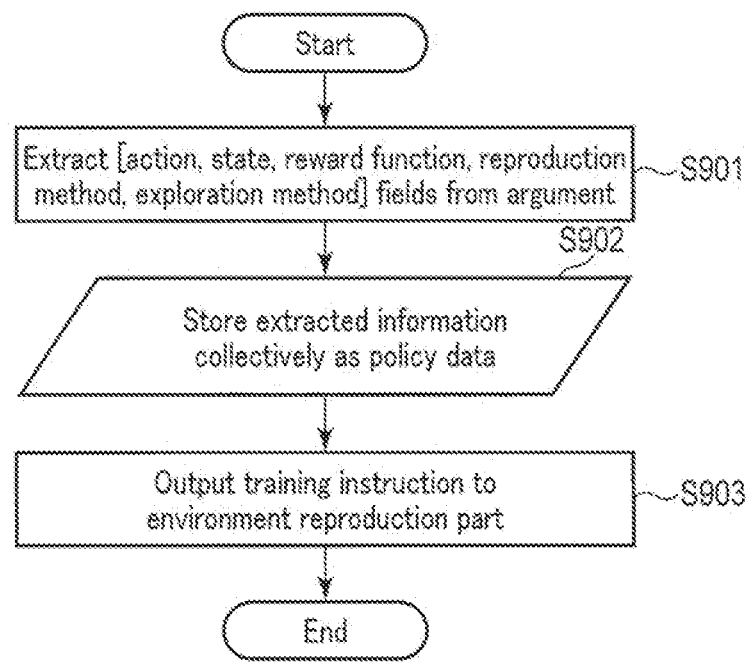
FIG. 10 is a flowchart showing an example of a processing procedure and processing contents of policy management by the action optimization device shown in FIG. 1.

FIG. 10 is a flowchart showing an example of a processing procedure and processing contents for generating policy data by the action optimization device 1. In the embodiment, the policy management part 22 receives policy information output by the GUI management part 21, and generates policy data based on the policy information.

In step S901, under control of the policy management part 22, the action optimization device 1 receives the policy information output from the GUI management part 21 as an argument, and extracts the action, state, reward function, reproduction method, and exploration method fields from the argument.

In step S902, under the control of the policy management part 22, the action optimization device 1 collectively stores the information extracted from the argument in the policy data memory 32 as policy data.

In step S903, under the control of the policy management part 22, the action optimization device 1 outputs a training instruction to the environment reproduction part 27, and ends the processing. The training instruction may include policy data, or may include a notification indicating that policy data is newly stored in the policy data memory 32.

FIG. 11 is a diagram showing an example of policy data generated by the policy management part 22. In the embodiment, the policy data includes fields of "identifier" for uniquely identifying each policy, "action" indicating control of a target space, "state" indicating a name of environmental data affected when an action is changed, "reward function" indicating an evaluation equation used by the exploration part 28 in a training phase, "reproduction method" indicating a model used by the environment reproduction part 27, and "exploration method" indicating a model used by the exploration part 28. As for the reward function, reproduction method, and exploration method, a program which is converted into an executable state (hereinafter, referred to as a "binary") may be described, or a name of model data may be described. In addition, a binary may be stored in the data memory 30 as model data, and the name or identifier of the model data may be used.

Hereinafter, for each description content of the policy data, when a time t is given, a value of environmental data corresponding to the action field is referred to as an action a, a value of environmental data corresponding to the state field is referred to as a state s, and a state when one action a is selected from a plurality of actions a assumed in the state s and the time is advanced by one by performing the one action a is referred to as a next-state s'; further, the content of the reward function field is referred to as a reward function R, and a value obtained by inputting the action a, state s, and next-state s' at the time t to the reward function R is referred to as a reward r.

For example, when "air conditioning" is described in the action field, an air conditioning field of air conditioning data stored as environmental data is extracted and used as an action a at each time t. A data name and a field name may be individually set in the form of, for example, "(BEMS data, air conditioning)". In a case where there are a plurality of air conditioners, an action at each time cannot be uniquely obtained only by the air conditioning field. Thus, the identifier field is also included automatically as a target, and a pair of the identifier field and the air conditioning field is read as an action a. The field name may be clearly specified as, for example, "(BEMS data, [air conditioning, identifier])".

For each of the reproduction method, exploration method, and reward function, when a binary is described, the binary may be evaluated and stored in the data memory as model data, and may be overwritten with the identifier or name of the model data. Note that the policy management part 22 is not limited to using the information from the GUI management part 21 as a startup trigger. For example, a functional part that receives a request including necessary parameters from the building and energy management system MS may be newly provided, and the above policy data generation processing may be performed using the request as a trigger.

(6) Training of Environment Reproduction Model

Figure 12:
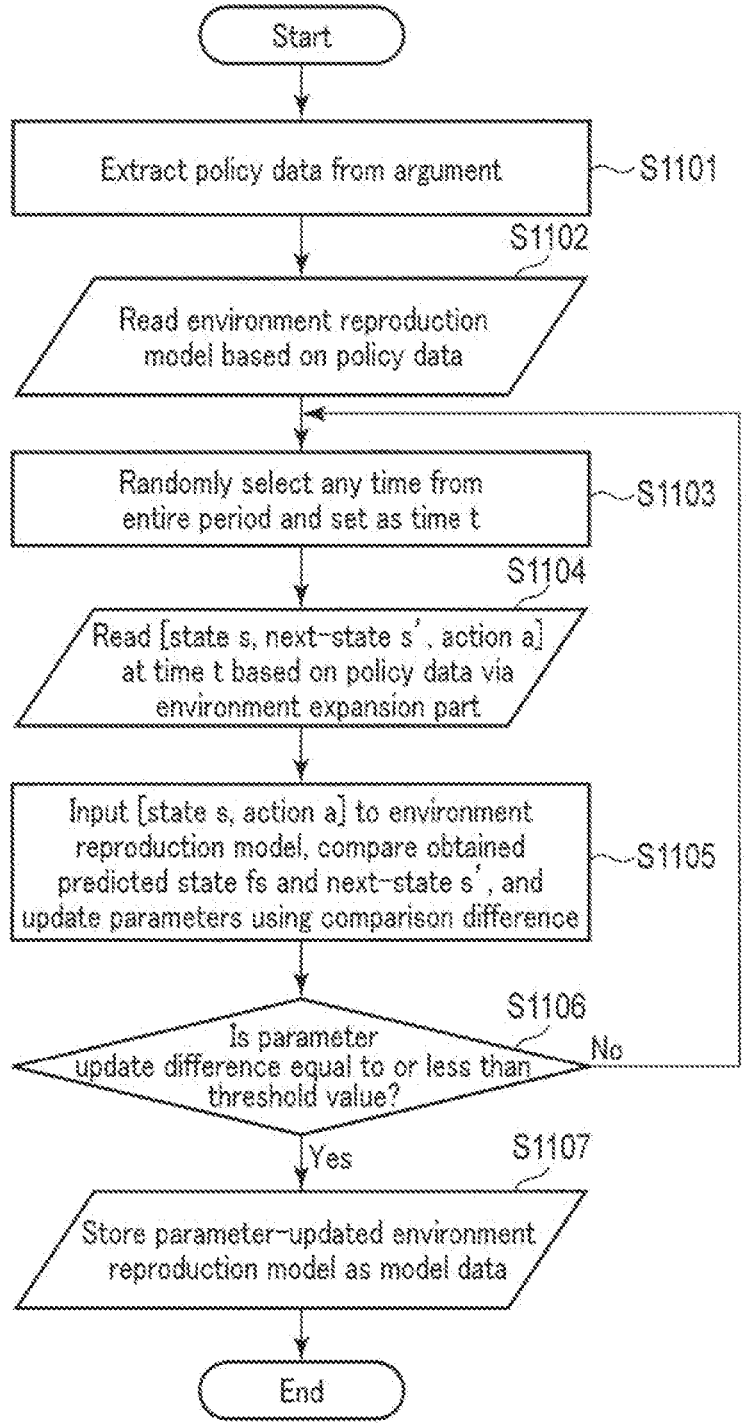
FIG. 12 is a flowchart showing an example of a procedure and processing contents of training processing of an environment reproduction model by the action optimization device shown in FIG. 1.

FIG. 12 is a flowchart showing an example of a processing procedure and processing contents for training, by the action optimization device 1, from past data how an environment in a target space changes when an action for controlling the environment is changed. In the embodiment, under control of the environment reproduction part 27, the action optimization device 1 receives a training instruction from the policy management part 22 and starts training of an environment reproduction model (the training phase). In the training phase, the environment reproduction part 27 functions as an environment reproduction model training part, acquires policy information as an argument from the policy management part 22 or the policy data memory 32, and trains an environment reproduction model for predicting a next-state s' when an action a is performed in a state s at a time t by using data of the entire period. The training may be performed every time a facility layout is changed.

First, in step S1101, under the control of the environment reproduction part 27, the action optimization device 1 extracts policy data from an argument output from the policy management part 22.

In step S1102, under the control of the environment reproduction part 27, the action optimization device 1 reads an environment reproduction model corresponding to the content described in the reproduction method field.

In step S1103, under the control of the environment reproduction part 27, the action optimization device 1 randomly selects any time from the entire period and sets the selected time as a time t.

In step S1104, under the control of the environment reproduction part 27, the action optimization device 1 sends a request for reading the action a, state s, and next-state s' at the time t to the environment expansion part 26, and obtains the data. However, this step is optional, and the environment reproduction part 27 may be configured to directly read the action a, state s, and next-state s' at the time t from the data memory 30. Processing of the environment expansion part 26 will be described later.

In step S1105, under the control of the environment reproduction part 27, the action optimization device 1 inputs the state s and the action a to the read environment reproduction model, calculates a difference between a state fs, which is an output predicted value, and the next-state s', which is a correct answer value, and updates each parameter of the environment reproduction model using a publicly-known technique such as backpropagation (see, e.g., C. M. Bishop, translation supervised by Hiroshi Genta et al., "Pattern Recognition and Machine Learning, Vol. 1", Maruzen Publishing Co., Ltd., Jul. 30, 2016, seventh print).

In step S1106, under the control of the environment reproduction part 27, the action optimization device 1 determines whether or not the difference of the above parameter update is equal to or less than a predetermined threshold value. If it is determined that the difference is not equal to or less than the threshold value, the environment reproduction part 27 returns to step S1103 and repeats the processing of steps S1103 to S1105. If it is determined in step S1106 that the difference of the parameter update is equal to or less than the threshold value, the process proceeds to step S1107.

In step S1107, under the control of the environment reproduction part 27, the action optimization device 1 stores the environment reproduction model in which the parameters are updated in the model data memory 33 as model data, and ends the processing.

A start time field and an end time field may be newly provided in the policy input screen 210 provided by the GUI management part 21, the input by the user may be received and output to the policy management part 22, and the policy management part may further pass the input value to the environment reproduction part 27 so as to perform training using data of the designated period.

By the training using the area data interpolated by the environmental data interpolation part 24, it is possible to estimate an influence of a control change taking into account an interaction existing in the target space.

(7) Data Augmentation Processing

As described above, the environment reproduction part 27 can use data subjected to augmentation processing in the training processing.

Figure 13:
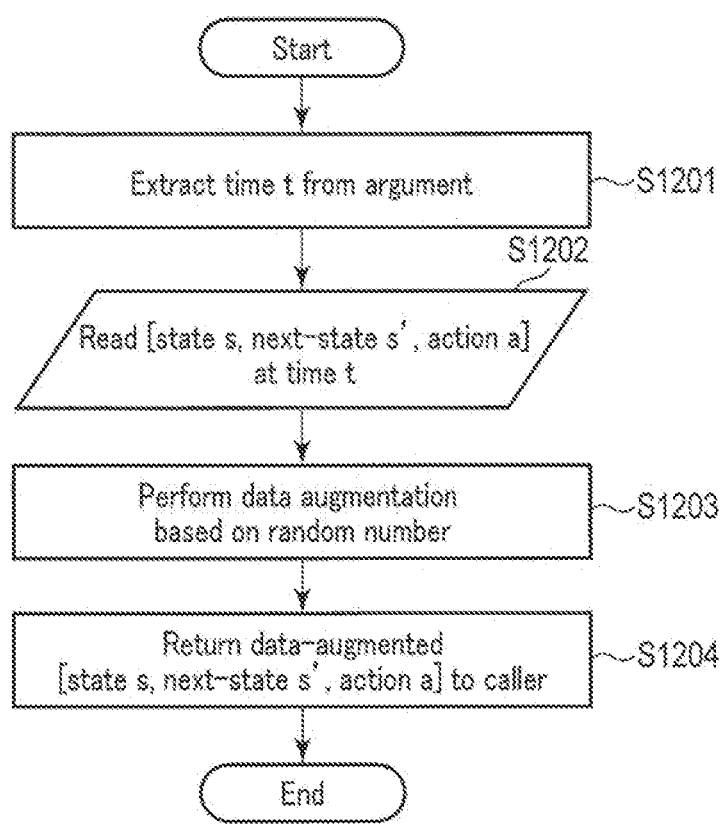
FIG. 13 is a flowchart showing an example of a procedure and processing contents of data augmentation processing by the action optimization device shown in FIG. 1.

FIG. 13 is a flowchart showing an example of a processing procedure and processing contents of data augmentation by the action optimization device 1. In the embodiment, data augmentation processing is performed by the environment expansion part 26 of the action optimization device 1. This processing is optional processing that can be used in the training phase by the environment reproduction part 27.

In step S1201, under control of the environment expansion part 26, the action optimization device 1 extracts a time t from the argument.

In step S1202, under the control of the environment expansion part 26, the action optimization device 1 reads the action a, state s, and next-state s' at the designated time t.

In step S1203, under the control of the environment expansion part 26, the action optimization device 1 performs data augmentation processing based on random numbers within a range that does not destroy a relationship between the action a and the state s (hereinafter, collectively referred to as an "input side") as inputs and the next-state s' (hereinafter, referred to as an "output side") as an output in the environment reproduction model.

In step S1204, under the control of the environment expansion part 26, the action optimization device 1 returns the data-augmented [state s, next-state s', action a] to a caller (here, the environment reproduction part 27) as a processing result.

Note that the environment expansion part 26 is not limited to being activated in response to a request from the environment reproduction part 27. For example, like the environment prediction part 25 and the environment reproduction part 27, the environment expansion part 26 may be activated at regular time intervals or by detecting storage in the data memory 30, and may store the augmentation data subjected to the data augmentation processing in the environmental data memory 31 as environmental data. At this time, an augmentation flag may be given to the environmental data, and the flag value may be referred to to switch which of the augmentation data and non-augmentation data to use.

In the embodiment, an environmental data name and a data augmentation method to be applied are individually set in the config file in advance, and data augmentation can be performed according to the contents of the config file.

Further, for example, when a plurality of air conditioners are designated as actions, a list of area information including positions and sizes of predefined space ranges (hereinafter, referred to as "air-conditioned areas") in a facility served by the respective air conditioners may be described in the config file, area data may be divided by determining to which air-conditioned area the data of each point of the area data belongs based on the config file, and data augmentation may be performed in divided data units.

As described above, for example, in a case where noise is added to temperature data on the input side, it is possible to achieve such training of a reproduction model with high robustness as to permit fluctuation of an actually measured value of the temperature data. In addition, in a case where common mask processing is applied to both the input side and the output side in area units, the interaction between areas can be taken into account or the areas can be decoupled from each other to achieve training. In a case where mask processing is performed such that only one area remains, as training for each area progresses using only data of the area itself, prediction by separating the relationship between the areas can be performed. Thus, even if only data with the same control timing of a plurality of air conditioners can be observed, for example, prediction in a case of controlling the air conditioners individually can be performed. In addition, in a case where mask processing is performed such that a plurality of areas remain, as training for each area progresses using not only data of the area itself but also data of other areas, prediction taking into account the relationship between the areas can be performed. Thus, for example, it becomes possible to consider area characteristics such as cold/warm air inflow or heat accumulation being likely to occur. Since training in which the above is mixed progresses by using random numbers, it is possible to perform natural prediction for various variations with a small amount of data.

(8) Evaluation using Environment Reproduction Model

FIG. 14 is a flowchart showing an example of a processing procedure and processing contents for predicting (herein, also referred to as "evaluating") a next-state s' when performing an action a in a state s at a designated time t by the action optimization device 1 using a trained environment reproduction model. In the embodiment, under the control of the environment reproduction part 27, the action optimization device 1 receives an evaluation instruction from the exploration part 28 and starts evaluation processing (the evaluation phase).

In step S1301, under the control of the environment reproduction part 27, the action optimization device 1 receives, as an argument, information transmitted from the exploration part 28 together with the evaluation instruction, and extracts policy data, the time t, a period tr, and the action a from the argument.

In step S1302, under the control of the environment reproduction part 27, the action optimization device 1 determines whether or not the extracted action a is empty. If it is determined that the action is not empty, the process proceeds to step S1303. On the other hand, if it is determined in step S1302 that the action a is empty, the process proceeds to step S1304 to determine the above evaluation instruction from the exploration part 28 to be an initial state acquisition command, setting the state s at the time t as the next-state s', and setting 0 as the reward r, and the process proceeds to step S1308.

In step S1303, under the control of the environment reproduction part 27, the action optimization device 1 reads the trained environment reproduction model and a reward function R based on the extracted policy data.

Subsequently, in step S1305, under the control of the environment reproduction part 27, the action optimization device 1 reads the state s at the time t, and if the next-state s' predicted in the previous processing remains in the memory, the action optimization device 1 uses the next-state s' as the state s.

In step S1306, under the control of the environment reproduction part 27, the action optimization device 1 inputs the state s and the action a to the environment reproduction model, and sets an output predicted state fs as the next-state s'.

In step S1307, under the control of the environment reproduction part 27, the action optimization device 1 inputs the state s, next-state s', and action a to the reward function R to acquire the reward r.

In step S1308, under the control of the environment reproduction part 27, the action optimization device 1 outputs the next-state s' and the reward r to a request source (here, the exploration part 28) as an ending procedure of the processing.

In step S1309, under the control of the environment reproduction part 27, the action optimization device 1 stores the next-state s' in the memory so that, when prediction at a time t+1 is performed next, processing can be performed by using a predicted value, instead of an actually measured value, as the state s at the time t. However, if the time t exceeds the period tr, the prediction at the time t+1 is not requested, and thus the next-state s' is not stored.

For the next-state s' to be output to the request source, when a field $s_i$ that is not affected by the change of the action a is known in advance, a pair of the policy data identifier and the state field $s_i$ may be described in the config file in advance, and the field $s_i$ may be overwritten with a value of $s_i$ included in the next-state s' at the time t existing in the data memory 30, instead of the value calculated by the environment reproduction model, based on the config file, and returned. In the training phase, training may be performed after the $s_i$ field is deleted from the output of the environment reproduction model.

(9) Acquisition of Exploration Instruction

Next, acquisition of an exploration instruction input via a GUI will be described.

Figure 15:
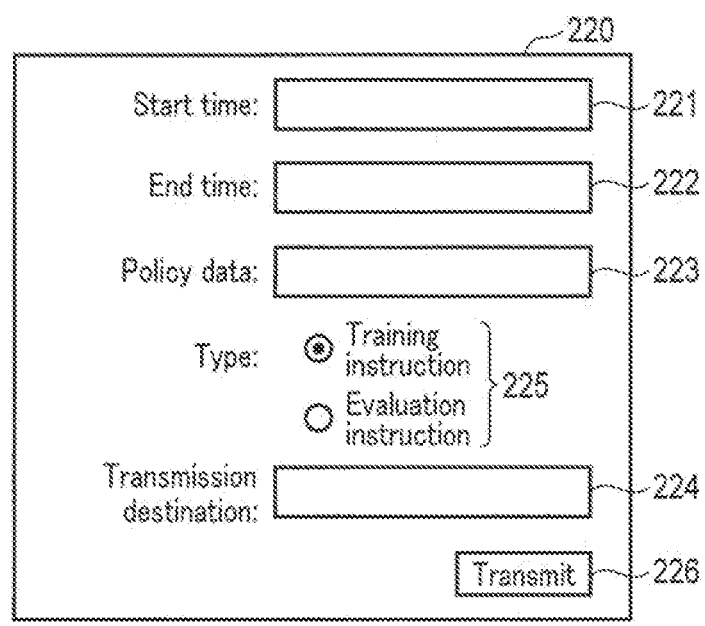
FIG. 15 is a diagram showing an example of a GUI screen used for specifying an exploration operation of the action optimization device shown in FIG. 1.

FIG. 15 shows an input screen 220 of an exploration instruction displayed on a display part, etc. (not shown) as an example of a GUI for inputting an instruction related to an exploration, which is provided by the GUI management part 21 of the action optimization device 1. The GUI management part 21 can fetch an exploration instruction input by a user or an operator using an input device (not shown) such as a keyboard, a mouse, or a touch panel via such an exploration instruction input screen 220. The exploration instruction input screen 220 includes text boxes 221 to 224 for inputting a start time, an end time, policy data, and a transmission destination, a radio button 225 for inputting a type, and a transmission button 226 for ending the input, but is not limited thereto.

A start time field 221 and an end time field 222 are fields for inputting data of which period is used.

A policy data field 223 is a field for inputting an identifier of policy data output by the policy management part.

A type field 225 is a field for selecting which of a training instruction and an evaluation instruction is transmitted to the exploration part 28.

A transmission destination field 224 is a field for, when an input is additionally required when the evaluation instruction is selected in the type field 225, inputting a destination to which the exploration result output by the evaluation phase is transmitted. In the present example, it is assumed that the building and energy management system MS includes an API for receiving the exploration result through an HTTP communication and a URL of the API is input, but the example is not limited thereto. For example, a communication method by a specific protocol may be described.

When the transmission button 226 is pressed and the input is completed, the GUI management part 21 outputs the above contents to the exploration part 28. At this time, either the training phase or the evaluation phase is automatically selected according to the input value of the type field 225.

(10) Training of Exploration Model

Figure 16:
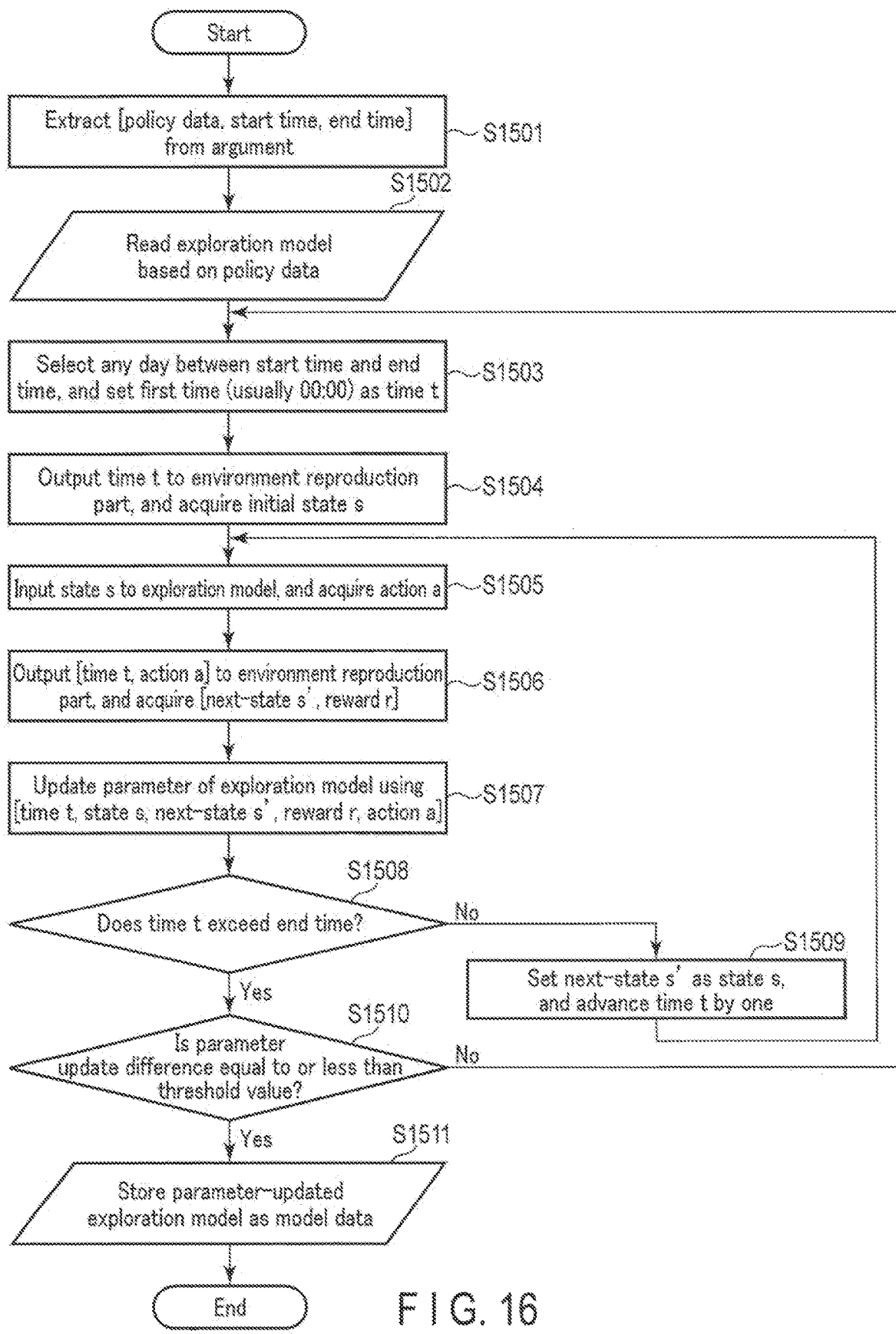
FIG. 16 is a flowchart showing an example of a procedure and processing contents of training processing of an exploration model by the action optimization device shown in FIG. 1.

FIG. 16 is a flowchart showing an example of a processing procedure and processing contents for training of an exploration model used for an exploration by the action optimization device 1. In the embodiment, under control of the exploration part 28, the action optimization device 1 starts training of an exploration model in response to a training instruction from the GUI management part 21 (the training phase). In the training phase, the exploration part 28 functions as an exploration model training part, acquires the information transmitted from the GUI management part 21 as an argument, and performs training of an exploration model for predicting an action a for a state s at each time t to transition to an optimal next-state s' using data of a designated period.

In step S1501, under the control of the exploration part 28, the action optimization device 1 extracts policy data, a start time, and an end time from the argument.

In step S1502, under the control of the exploration part 28, the action optimization device 1 reads an exploration model corresponding to a content described in an exploration method field of the extracted policy data.

In step S1503, under the control of the exploration part 28, the action optimization device 1 further randomly selects any day between the start time and the end time, and sets 00:00 of that day as the time t.

In step S1504, under the control of the exploration part 28, the action optimization device 1 outputs the time t, an empty action a, and a period tr including the start time and the end time to the environment reproduction part 27, and acquires an initial state s. Note that the time may not be 00:00, and for example, when optimization at night is not necessary, the business start time (09:00, etc.) of the facility may be designated.

In step S1505, under the control of the exploration part 28, the action optimization device 1 inputs the state s to the exploration model and acquires an action a to be taken next. When acquiring the action a, not only may the best candidate selected by the exploration model be selected from a plurality of candidates, but also a random candidate may be selected with a certain probability in order to proceed with an unknown exploration.

Subsequently, in step S1506, under the control of the exploration part 28, the action optimization device 1 outputs the time t, the action a, and the period tr to the environment reproduction part 27, and acquires a next-state s' and a reward r.

In step S1507, under the control of the exploration part 28, the action optimization device 1 updates each parameter of the exploration model by using a publicly known technique such as backpropagation using a result including the time t, state s, next-state s', reward r, and action a (see, e.g., C. M. Bishop, translation supervised by Hiroshi Genta et al., "Pattern Recognition and Machine Learning, Vol. 1", Maruzen Publishing Co., Ltd., Jul. 30, 2016, seventh print). Instead of updating the parameters each time, the result may be temporarily stored in a memory to update the parameters in a batch process using a plurality of results, or a look-ahead reward $r'=r_1+r_2$ may be obtained using results at consecutive times $t_1$ and $t_2$ to update the parameters with the time $t_1$, a state $s_1$, a next-state $s_2'$, and the reward r'.

In step S1508, under the control of the exploration part 28, the action optimization device 1 determines whether or not the time t exceeds the end time. If it is determined that the time t does not exceed the end time, the process proceeds to step S1509, the time t is advanced by one, the next-state s' is substituted for the state s, and then the processing of steps S1505 to S1507 is repeated.

On the other hand, if it is determined in step S1508 that the time t exceeds the end time, the process proceeds to step S1510.

In step S1510, under the control of the exploration part 28, the action optimization device 1 determines whether or not a parameter update difference is equal to or less than a predetermined threshold value. If it is determined in step S1510 that the parameter update difference is not equal to or less than the threshold value, it is determined that there is still room for training, and the process proceeds to step S1503 to repeat training based on data on another day. If it is determined in step S1510 that the parameter update difference is equal to or less than the threshold value, the process proceeds to step S1511.

In step S1511, under the control of the exploration part 28, the action optimization device 1 stores the parameter-updated exploration model in the model data memory 33 as model data, and ends the processing.

In this way, under the control of the exploration part 28, the action optimization device 1 performs training of the exploration model while communicating with the environment reproduction part 27 in the training phase.

(11) Evaluation Using Exploration Model

Figure 17:
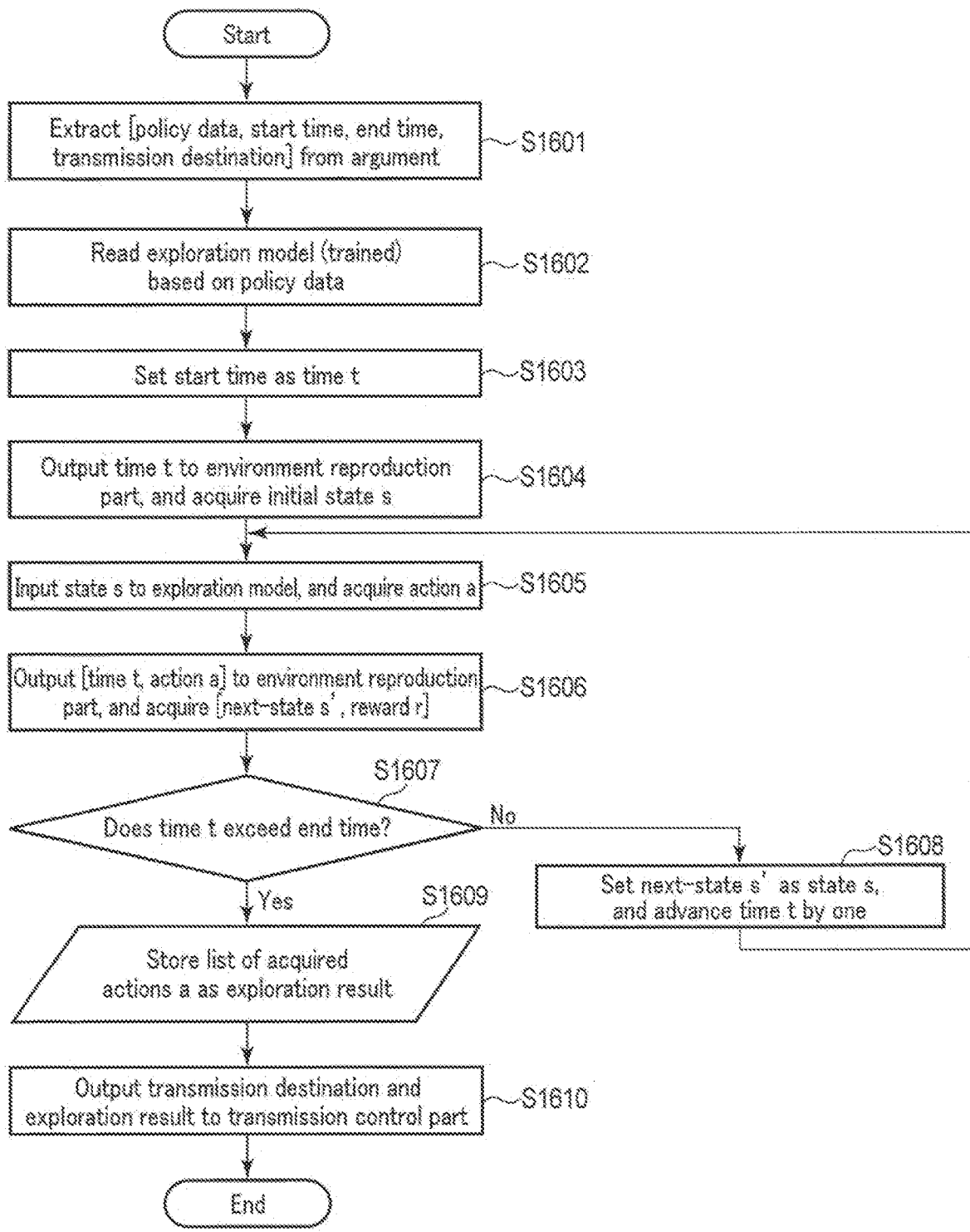
FIG. 17 is a flowchart showing an example of a procedure and processing contents of evaluation processing using an exploration model by the action optimization device shown in FIG. 1.

FIG. 17 is a flowchart showing an example of a processing procedure and processing contents for performing an exploration by the action optimization device 1 using a trained exploration model. In the embodiment, under the control of the exploration part 28, the action optimization device 1 receives an evaluation instruction output by the GUI management part 21 and starts evaluation processing (the evaluation phase). For example, the exploration part 28 can be configured to perform evaluation processing for each day, and generate an exploration result for the next day.

In the evaluation phase, processing is basically performed in the same procedure as that of the training phase, but the evaluation phase is different from the training phase in that an action a for a state s to transition to an optimal next-state s' is evaluated while continuously advancing a time t from a start time to an end time, the exploration model is not updated, and a list of actions a acquired before the end of processing is stored as an exploration result. The exploration result can also include metadata such as an identifier of policy data used when generating the exploration result.

In step S1601, under the control of the exploration part 28, the action optimization device 1 extracts policy data, a start time, an end time, and a transmission destination from an argument.

In step S1602, under the control of the exploration part 28, the action optimization device 1 reads a trained exploration model corresponding to a content described in an exploration method field of the extracted policy data.

In step S1603, under the control of the exploration part 28, the action optimization device 1 further sets the start time as a time t.

In step S1604, under the control of the exploration part 28, the action optimization device 1 outputs the time t, an empty action a, and a period tr including the start time and the end time to the environment reproduction part 27, and acquires an initial state s.

In step S1605, under the control of the exploration part 28, the action optimization device 1 inputs the state s to the exploration model, and acquires an action a to be taken next.

In step S1606, under the control of the exploration part 28, the action optimization device 1 then outputs the time t, action a, and period tr to the environment reproduction part 27, and acquires a next-state s' and a reward r.

In step S1607, under the control of the exploration part 28, the action optimization device 1 determines whether or not the time t exceeds the end time. If it is determined that the time t does not exceed the end time, the process proceeds to step S1608, the time t is advanced by one, the next-state s' is substituted for the state s, and then the processing of steps S1605 to S1606 is repeated. On the other hand, if it is determined in step S1607 that the time t exceeds the end time, the process proceeds to step S1609.

In step S1609, under the control of the exploration part 28, the action optimization device 1 stores a list of the acquired actions a in the exploration result memory 34 as an exploration result.

In step S1610, under the control of the exploration part 28, the action optimization device 1 outputs, to the transmission control part 29, the exploration result or a notification indicating that the exploration result should be transmitted, together with the transmission destination extracted from the argument.

In this way, the exploration part 28 performs exploration processing while communicating with the environment reproduction part 27 even in the evaluation phase.

The training phase and the evaluation phase of the exploration part 28 are not limited to being activated based on the information from the GUI management part 21. For example, the phases may be performed at predetermined time intervals, or the exploration part 28 itself may detect an event such as storage in the data memory 30 to perform corresponding processing. In this case, a set of necessary parameters such as policy data, a start time, an end time, and a transmission destination, an activation phase, and the event can be described in a config file.

(12) Output of exploration Result

Figures 18, 19:
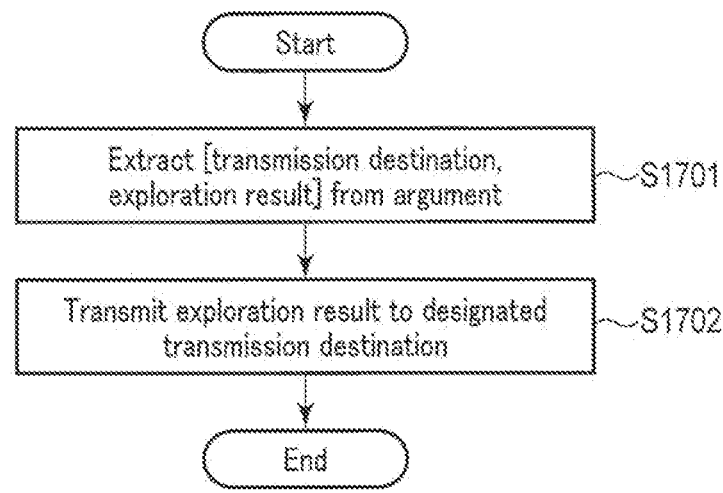
FIG. 18 is a flowchart showing an example of a processing procedure and processing contents of output by an output part of the action optimization device shown in FIG. 1.
FIG. 19 is a diagram showing an example of an exploration result by the action optimization device shown in FIG. 1.

FIG. 18 is a flowchart showing an example of a processing procedure and processing contents in which the action optimization device 1 transmits an exploration result to the building and energy management system MS. In the embodiment, the action optimization device 1 executes this processing under control of the transmission control part 29.

In step S1701, under the control of the transmission control part 29, the action optimization device 1, by using the information output from the evaluation phase of the exploration part 28 as an argument, extracts a transmission destination and an exploration result from the argument.

In step S1702, under the control of the transmission control part 29, the action optimization device 1 performs processing of transmitting the exploration result to the designated transmission destination.

However, the output of the exploration result is not limited to this procedure, and may be activated in response to an exploration result acquisition request from the building and energy management system MS or by a user instruction via a command transmission screen newly provided in the GUI management part 21.

FIG. 19 is a diagram showing an example of the exploration result to be output. The exploration result includes fields of "time" indicating the timing of changing a control and "action" indicating how to change each of several controls. However, each field item of the exploration result is not limited thereto, and for example, all times may be output instead of summarizing only the change timings, or fields having names corresponding to identifiers may be increased or decreased in the same number as the number of controls.

As described above, in this embodiment, at a certain time, when only a predicted value predicted based on an actually measured value can be acquired, the predicted value is used, and when both a predicted value and an actually measured value can be acquired, the actually measured value is used. Cases where a predicted value is used include, for example, the following.

- Case where the exploration part 28 performs action optimization of a future period in the evaluation phase (e.g., a case of calculating an exploration result for one day from that point in time).
- Case where the environment reproduction part 27 knows that the accuracy of an existing predicted value is higher than that of its own prediction in the evaluation phase (e.g., a case where a predicted outside air temperature has been acquired from the Meteorological Agency). In the latter case, since an outside air temperature on the output side of the environment reproduction model is not used, the outside air temperature data is deleted from the output of the environment reproduction model through the config file and then each of the training phase and the evaluation phase is executed in the environment reproduction part 27.

Example 2

FIG. 20 is a diagram showing a second example of an overall configuration of a system including the action optimization device 1 according to the embodiment of the present invention. In this example, the action optimization device 1 is assumed to detect dirt conditions in a target area using a dust sensor and optimize cleaning in the target area, as an action for controlling an environment in a target space. As compared to the system shown in FIG. 1, the sensor system SS comprises, in addition to the sensors Ss1, . . . , Ssn, a vacuum cleaner (or a sensor provided in the vacuum cleaner) Sm1, an air cleaner (or a sensor provided in the air cleaner) Sm2, and a camera Sm3 as additional sensors. By these additional sensors, for example, environmental data including information indicating dirt such as data obtained by measuring an amount of dust sucked in by the vacuum cleaner with an infrared sensor, a value of a dust sensor of the air cleaner, and data obtained by detecting a dirty portion from an image of the camera is acquired.

Figure 21:
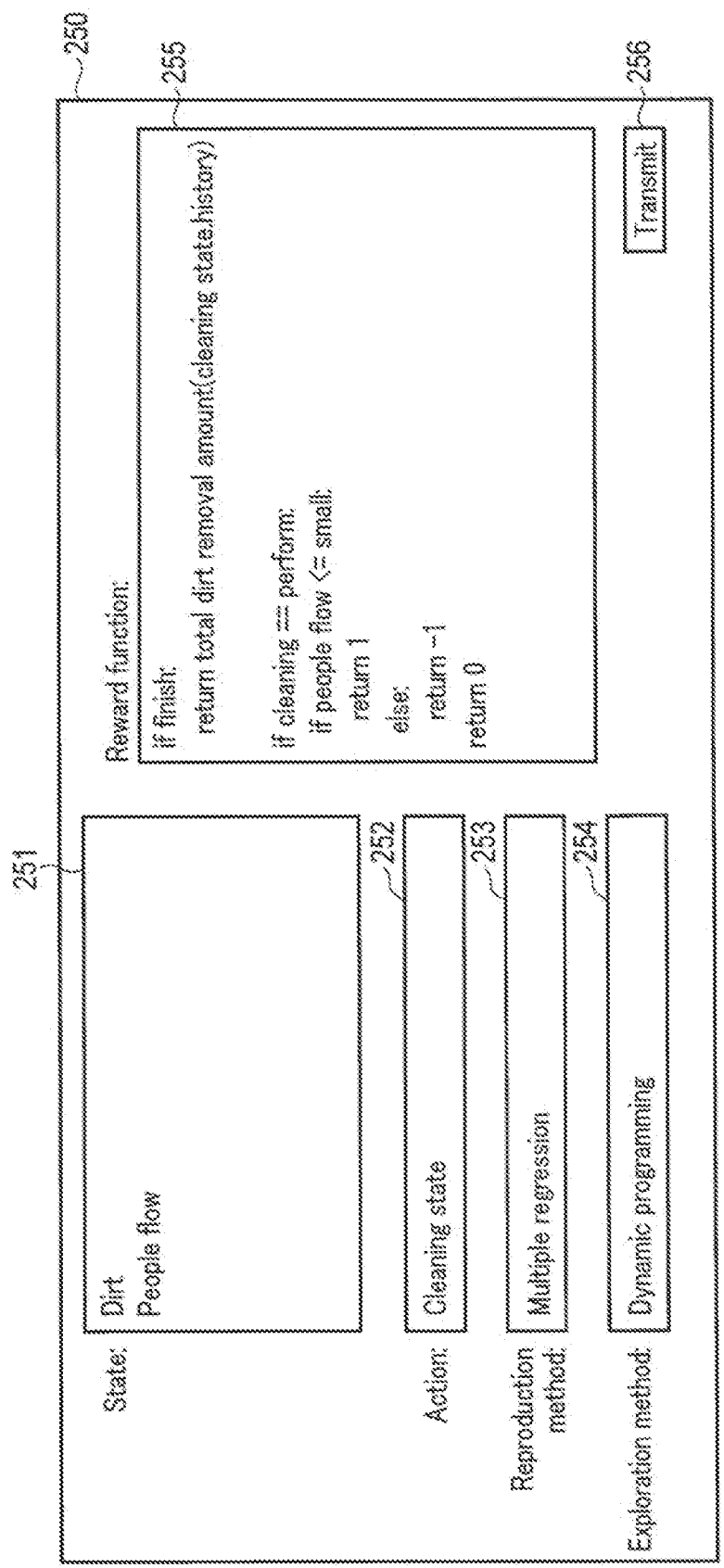
FIG. 21 is a diagram showing a second example of a GUI screen used for specifying an operation policy of the action optimization device shown in FIG. 20.

FIG. 21 is a diagram showing a cleaning optimization policy input screen 250 as an example of a GUI that can be provided by the GUI management part 21 of the action optimization device 1 in the system of Example 2. The policy input screen 250 includes text boxes 251 to 255 for inputting a state, an action, a reward function, a reproduction method, and an exploration method, and a transmission button 256 for ending the input, but is not limited thereto.

The policy input screen 250 is different in input contents from the policy input screen 210 shown in FIG. 9 in that a cleaning state (i.e., cleaning is performed at the time) is input as a control in an action field 252, and dirt and a people flow are input in a state field 251. In a reward function field 255, such inputs are exemplified as to return a total dirt removal amount of 1 day in a case where 1 training cycle is completed, and in the other cases, +1 or −1 (0 when cleaning is not performed) depending on a people flow amount when cleaning is performed. In addition, such inputs are exemplified as to use multiple regression as a reproduction model in a reproduction method field 253, and dynamic programming as an exploration model in an exploration method field 254. However, the inputs are not limited thereto, and, for example, a cleaning intensity indicating how intensively cleaning should be performed may be designated in the action field 252, the material of a floor may be added to the state field 251, or an item for minimizing the time required for cleaning may be added to the reward field 255.

In addition, in the system according to Example 2, the configuration and each operation of the action optimization device 1 are the same as those of Example 1, and thus detailed description thereof will be omitted.

(Effect)

As described above in detail, in an embodiment of the present invention, the action optimization device 1 acquires environmental data related to a space to be controlled from the sensor system SS or the building and energy management system MS, and performs time/space interpolation on the acquired environmental data. Based on this time/space-interpolated environmental data, the environment reproduction part 27 trains an environment reproduction model such that, when a state of an environment and an action for controlling the environment are input, a correct answer value of an environmental state after the action is output, and predicts a change in environment (a next-state s' when an action a is performed in a state s at a time t) based on the trained environment reproduction model. On the other hand, the exploration part 28 trains an exploration model for predicting an action a for a state s at each time t to transition to an optimal next-state s' while communicating with the environment reproduction part 27, and acquires and outputs a list of appropriate actions to be taken for respective states based on the trained exploration model while also communicating with the environment reproduction part 27.

Therefore, according to the embodiment, since training and evaluation are performed by the environment reproduction part 27 and the exploration part 28 after a change in future environmental data is predicted in advance based on actually acquired environmental data, it is possible to realize optimization of an action to be taken by highly reliable feedforward control. Thus, in the management of a building or a facility such as an office building, an appropriate control schedule can be obtained for any management target such as air conditioning or cleaning, and an efficient management operation that responds to a change in environment in a space in a timely manner is possible.

In addition, since the environmental data interpolation part 24 performs time/space interpolation on the acquired environmental data, it is also possible to perform training and evaluation based on a control effect of an entire target space taking into account changes in local environmental conditions. Thus, a problem caused by non-uniformity of environmental conditions such as heat accumulation is solved. In addition, since an influence from an adjacent space is also taken into consideration, it is possible to realize an exploration with higher accuracy even taking into account an interaction existing in the target space.

Furthermore, the environment prediction part 25 is provided to perform future prediction from the acquired environmental data so as to obtain environment prediction data. Accordingly, even in an environment in which a predicted value (e.g., a predicted people flow or predicted weather) cannot be acquired from an external device, etc., it is possible to perform each instance of processing including an exploration using the environment prediction data.

Since a policy of action optimization, a startup timing of a training phase, a startup timing of an evaluation phase, a target period, etc. can be easily set by the GUI management part 21, flexible control according to the situation of the building or facility can be performed. In addition, various instructions input via the GUI are managed as policy data by the policy management part 22, and a relationship between designated parameters (reproduction method, environment reproduction model, reward function, etc.) and model data is appropriately arranged.

Further, since apparent data can be increased by the environment expansion part 26, it is possible to shorten the time required for the environment reproduction part 27 or the exploration part 28 to acquire a sufficient amount of environmental data before starting training. In addition, since robustness of the prediction processing is improved by the data augmentation using random numbers, reliability of the environmental data subjected to the augmentation processing can be improved.

Furthermore, as a control target in the exploration processing of the action optimization device 1, in addition to a switching control such as ON/OFF of an air conditioner, various targets such as detailed setting of a set temperature, etc. and an operating status of each of a plurality of air conditioners can be set, and flexible control according to a purpose or an environment can be realized. In addition, an action of a group unit with respect to a control target group obtained by grouping control targets in advance can be set as a target of the exploration processing. Thus, proper control taking into account an actual environment can be performed by grouping based on a discretionary criterion, e.g., a section with many users and a section with few users, a section with a large amount of user movement and a section with a small amount of user movement, a section easily affected by outside air or solar radiation and a section hardly affected by outside air or solar radiation, a section with a heat source such as a kitchen and a section without a heat source, a section where an event is held and a section without an event, and a section where food and drink are provided and a section without food and drink. Moreover, a virtual action including a series of operations for performing a predetermined function may be set as a target of the exploration processing. In this way, for example, in a case where there is a procedure or an operation mode set in advance at the time of manufacturing, such as "startup preparation" or "dehumidification mode" in an air-conditioning device, it is possible to perform a more efficient control by collectively handling such a series of operations as a virtual action.

Furthermore, generally known operations leading to energy saving can be highly evaluated in a reward function. As a result, it is possible to explore for and control an appropriate action by positively utilizing the operations leading to energy saving.

Other Embodiments

The present invention is not limited to the above-described embodiment. For example, it has been described in the embodiment that an actually measured value of environmental data is acquired, and is subjected to time/space interpolation to be used for various processing. However, a predicted value obtained in the past may be used as a part of the environmental data as necessary. Thus, even in a case where data cannot be obtained for a certain period of time due to a failure of a sensor or a communication error, data can be appropriately supplemented and used for processing. In addition, the interpolation and prediction of data are not limited to the above-described techniques, and various techniques can be used.

In the above-described embodiment, a GUI for instruction input is provided by the GUI management part 21, but these are not essential configurations. Policy data may be acquired in any other format. For example, a data set indicating an initial setting may be stored in the data memory 30 in advance, and this data set may be read as the policy data. Alternatively, a character user interface (CUI) may be employed so that a user inputs an instruction by keyboard input.

In addition, as described above, training by the environment reproduction part 27 or the exploration part 28 may be started at any timing, and a user, etc. may be allowed to change the timing as needed according to a situation or a control target.

In the above-described embodiment, the exploration part 28 has been described as exploring for an action for a given environmental state to transition to an optimal next state, but is not necessarily limited thereto. For example, the exploration result by the exploration part 28 does not necessarily require only an optimum action to be output, and may include a sub-optimum action or an action that may be temporarily or unilaterally evaluated as not being optimum. The exploration part 28 can output various actions for various environmental states when performing training or evaluation. In addition, the exploration part 28 can adopt various techniques known as optimum condition exploration or optimum exploration upon training or evaluation.

Further, the type of the actually measured value, the content of the policy data, etc. can be variously modified without departing from the scope of the present invention.

In short, the present invention is not limited to the above-described embodiments as they are, and can be embodied by modifying the constituent elements without departing from the scope of the invention at the implementation stage. Further, various inventions can be formed by appropriately combining a plurality of constituent elements disclosed in the above-described embodiments. For example, some constituent elements may be deleted from all the constituent elements indicated in the embodiments. Furthermore, the constituent elements of the different embodiments may be appropriately combined.

(Notes)

Some or all of the above-described embodiments can be described as indicated in the following supplementary notes in addition to the claims, but are not limited thereto.

[C1]

An action optimization device for optimizing an action for controlling an environment in a target space, the action optimization device comprising:

an environmental data acquisition part that acquires environmental data related to a state of the environment in the target space;

an environmental data interpolation part that performs time/space interpolation on the acquired environmental data according to a preset algorithm;

an environment reproduction model training part that trains an environment reproduction model, based on the time/space-interpolated environmental data, such that, when a state of an environment and an action for controlling the environment are input, a correct answer value of an environmental state after the action is output;

an exploration model training part that trains an exploration model such that an action to be taken next is output when an environmental state output from the environment reproduction model is input;

an environment reproduction part that predicts a second environmental state corresponding to a first environmental state and a first action by using the environment reproduction model;

an exploration part that explores for a second action to be taken for the second environmental state by using the exploration model; and an output part that outputs a result of the exploration by the exploration part.

[C2]

The action optimization device according to the above C1, wherein the exploration part outputs the explored for second action to the environment reproduction part, the environment reproduction part further predicts a third environmental state corresponding to the second environmental state and the second action output from the exploration part by using the environment reproduction model, and the exploration part further explores for a third action to be taken for the third environmental state by using the exploration model.

[C3]

The action optimization device according to the above C1, wherein the environment reproduction part further outputs a reward corresponding to the second environmental state based on a preset reward function, and the exploration model training part updates a training result of the exploration model based on the reward output from the environment reproduction part.

[C4]

The action optimization device according to the above C1, further comprising an environment prediction part that performs future prediction using a preset time-series analysis method based on the environmental data to generate environment prediction data, wherein the exploration part explores for an action to be taken by using the environment prediction data for the exploration model.

[C5]

The action optimization device according to the above C1, further comprising an environment expansion part that performs data augmentation on the environmental data based on a random number, wherein the environment reproduction model training part trains the environment reproduction model by using the environmental data subjected to the data augmentation.

[C6]

The action optimization device according to the above C1, further comprising a policy data acquisition part that acquires policy data specifying information to be used for processing by the environment reproduction model training part, the exploration model training part, the environment reproduction part, or the exploration part.

[C7]

The action optimization device according to the above C1, wherein the exploration part explores for, as the second action, an action of a group unit for a control target group obtained by grouping a plurality of control targets based on a predetermined criterion in advance, or a series of actions for one or more control targets for realizing a predetermined function.

[C8]

An action optimization method executed by an action optimization device for optimizing an action for controlling an environment in a target space, the action optimization method comprising:

acquiring environmental data related to an environmental state in the target space;

performing time/space interpolation on the acquired environmental data according to a preset algorithm;

training an environment reproduction model, based on the time/space-interpolated environmental data, such that, when a state of an environment and an action for controlling the environment are input, a correct answer value of an environmental state after the action is output;

training an exploration model such that an action to be taken next is output when an environmental state output from the environment reproduction model is input;

predicting a second environmental state corresponding to a first environmental state and a first action by using the environment reproduction model;

exploring for a second action to be taken for the second environmental state by using the exploration model; and outputting a result of the exploration.

[C9]

A program for causing a processor to execute processing by each part of the device according to any one of the above C1 to C7.

REFERENCE SIGNS LIST

1: action optimization device
10: input/output interface part
20: controller/processor part
20A: hardware processor
20B: program memory
21: GUI management part
22: policy management part
23: environmental data acquisition part
24: environmental data interpolation part
25: environment prediction part
26: environment expansion part
27: environment reproduction part 28: exploration part
29: transmission control part
30: data memory
31: environmental data memory
32: policy data memory
33: model data memory
34: exploration result memory
210: policy input screen
220: exploration instruction input screen
250: policy input screen

The invention claimed is:

1. An action optimization device for optimizing an action for controlling air conditioning in a target space, comprising a processor and a memory connected to the processor, the action optimization device comprising:
   an environmental data acquisition unit configured to acquire environmental data related to a state of the environment in the target space including a people flow, a temperature, and a humidity and to store the acquired a plurality of environmental data items in an environmental data storage unit, wherein each of data of the people flow, the temperature, and the humidity included in the plurality of environmental data items includes a plurality of data items acquired at any different time;
   an environmental data interpolation unit configured to perform time/space interpolation on the plurality of acquired environmental data items according to a preset algorithm;
   an environment reproduction model training unit configured to train an environment reproduction model, based on the time/space-interpolated environmental data, such that, when a state of an environment and an action for controlling the environment are input, a correct answer value of an environmental state after the action is output;
   an environment expansion unit configured to perform data augmentation on the environmental data based on a random number within a range that does not destroy a relationship between the state of the environment, the action, and the environmental state;
   wherein the environment reproduction model training unit is configured to train the environment reproduction model by using the environmental data subjected to the data augmentation;
   an exploration model training unit configured to train an exploration model such that an action to be taken next is output when an environmental state output from the environment reproduction model is input, and store the trained exploration model in the memory;
   an action exploration unit configured to explore for a first action to be taken for a first environmental state by using the trained exploration model;
   an environment reproduction unit configured to predict a second environment state corresponding to the first environment state and the first action by using the trained environment reproduction model; and
   an output unit configured to output a result of the exploration.

2. The action optimization device according to claim 1, wherein
   the action exploration unit is configured to further explore for a second action to be taken for the second environmental state by using the trained exploration model; and
   the environment reproduction unit is configured to further predict a third environment state corresponding to the second environment state and the second action using the trained environment reproduction model.

3. The action optimization device according to claim 1, further comprising:
   an environment prediction unit configured to perform future prediction by using a preset time-series analysis method based on the environmental data to generate environment prediction data and store the generated environment prediction data in the environment data storage unit as environment data.

4. The action optimization device according to claim 1,
   a policy data acquisition unit configured to acquire policy data specifying information to be used for at least one processing of training the environment reproduction model, training the exploration model, predicting the second environmental state, and exploring for the first action.

5. The action optimization device according to claim 1, wherein
   the action exploration unit is configured to:
      explore for, as the first action, an action of a group unit for a control target group obtained by grouping a plurality of control targets based on a predetermined criterion in advance, or a series of actions for one or more control targets for realizing a predetermined function.

6. A non-transitory tangible computer-readable storage medium having stored thereon a program comprising instructions for causing a processor to execute so as to cause a computer to function as the action optimization device of any one of claims 1, 2, 3 and 4.

7. An action optimization method for an action optimization device including a processor and a memory connected to the processor to optimize an action for controlling an environment in a target space, the action optimization method comprising:
   acquiring a plurality of environmental data items related to a state of the environment in the target space including a people flow, a temperature, and a humidity, wherein each of data of the people flow, the temperature, and the humidity included in the plurality of environmental data items includes a plurality of data acquired at any different time;
   storing the plurality of acquired environmental data items in an environmental data storage unit;
   performing time/space interpolation on the acquired environmental data according to a preset algorithm;
   training an environment reproduction model, based on the time/space interpolated environmental data, such that, when a state of an environment and an action for controlling the environment are input, a correct answer value of an environmental state after the action is output, and storing the trained environment reproduction model in the memory;
   performing data augmentation on the environmental data based on a random number within a range that does not destroy a relationship between the state of the environment, the action, and the environmental state;
   wherein the training comprising a training the environment reproduction model by using the environmental data subjected to the data augmentation;
   training an exploration model such that an action to be taken next is output when an environmental state output from the environment reproduction model is input;
   exploring for a first action to be taken for a first environmental state by using the trained exploration model read;

predicting a second environment state corresponding to the first environment state and the first action by using the trained environment reproduction model; and outputting a result of the exploration.

* * * * *